United States Patent
Guim Bernat et al.

(10) Patent No.: US 11,048,528 B2
(45) Date of Patent: Jun. 29, 2021

(54) METHOD AND APPARATUS FOR COMPUTE END POINT BASED COLLECTIVE OPERATIONS

(71) Applicant: Intel Corporation, Santa Clara, CA (US)

(72) Inventors: Francesc Guim Bernat, Barcelona (ES); Kshitij A. Doshi, Tempe, AZ (US); Daniel Rivas Barragan, Cologne (DE); Alejandro Duran Gonzalez, Esplugues de Llobregat (ES)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/465,386

(22) PCT Filed: Jun. 28, 2017

(86) PCT No.: PCT/US2017/039764
§ 371 (c)(1),
(2) Date: May 30, 2019

(87) PCT Pub. No.: WO2018/125286
PCT Pub. Date: Jul. 5, 2018

(65) Prior Publication Data
US 2020/0004558 A1  Jan. 2, 2020

(30) Foreign Application Priority Data
Dec. 30, 2016  (ES) .................................. 201631737

(51) Int. Cl.
*G06F 15/16* (2006.01)
*G06F 9/448* (2018.01)
*H04L 29/08* (2006.01)

(52) U.S. Cl.
CPC ............ *G06F 9/4494* (2018.02); *H04L 67/10* (2013.01)

(58) Field of Classification Search
CPC .. G06F 9/4494; G06F 15/17318; G06F 9/448; H04L 67/10; H04L 29/08
See application file for complete search history.

(56) References Cited

U.S. PATENT DOCUMENTS

| 9,391,845 B2 | 7/2016 | Rimmer et al. |
| 10,015,056 B2 | 7/2018 | Heinz et al. |

(Continued)

FOREIGN PATENT DOCUMENTS

| CN | 106576055 A | 4/2017 |
| EP | 3198467 B1 | 7/2020 |
| WO | 2016/048476 A1 | 3/2016 |

OTHER PUBLICATIONS

International Search Report and Written Opinion for PCT Patent Application No. PCT/US2017/039764, dated Oct. 26, 2017, 13 pages.

(Continued)

*Primary Examiner* — Cheikh T Ndiaye
(74) *Attorney, Agent, or Firm* — Nicholson De Vos Webster & Elliott LLP

(57) ABSTRACT

Examples may include techniques for collective operations in a distributed architecture. A collective operation request message from a computing node causes collective operations at one or more target computing nodes communicatively coupled with the computing node through a network switch. The collective operation request message also causes the network switch to perform collective operations on collective operation results received from the one or more target computing nodes.

17 Claims, 10 Drawing Sheets

(56) References Cited

U.S. PATENT DOCUMENTS

| | | |
|---|---|---|
| 10,680,976 B2 | 6/2020 | Bernat et al. |
| 2008/0168471 A1 | 7/2008 | Benner et al. |
| 2010/0049836 A1 | 2/2010 | Kramer |
| 2011/0113083 A1* | 5/2011 | Shahar .................. H04L 49/356 709/201 |
| 2011/0225255 A1 | 9/2011 | Archer et al. |
| 2016/0065659 A1 | 3/2016 | Bloch et al. |
| 2016/0087848 A1 | 3/2016 | Heinz et al. |
| 2017/0063613 A1* | 3/2017 | Bloch ..................... H04L 12/44 |
| 2018/0091442 A1* | 3/2018 | Chen ..................... H04L 49/101 |
| 2020/0304425 A1 | 9/2020 | Bernat et al. |

OTHER PUBLICATIONS

International Preliminary Report on Patentability, PCT App. No. PCT/US2017/039764, dated Jul. 11, 2019, 10 pages.

Dosanjh et al., "Re-evaluating Network Onload vs. Offload for the Many-Core Era", IEEE International Conference on Cluster Computing, 2015, pp. 342-350.

Schultz, Scot, Becoming Familiar with the Mellanox "Smart Interconnect", Mellanox Technologies Blog, available online at <https://webcache.googleusercontent.com/search?q=cache:mL9Y_ZQB3U8J:https://blog.mellanox.com/2016/03/becoming-familiar-with-the-mellanox-smart-interconnect/+&cd=1&hl=en&ct=clnk&gl=us>, Mar. 15, 2016, 6 pages.

* cited by examiner

METHOD AND APPARATUS FOR COMPUTE END POINT BASED COLLECTIVE OPERATIONS

PRIORITY

This application is a U.S. National Phase application under 35 U.S.C. § 371 of International Application No. PCT/US17/39764 filed Jun. 28, 2017 entitled "METHOD AND APPARATUS FOR COMPUTE END POINT BASED COLLECTIVE OPERATIONS", which claims priority under 35 U.S.C. § 365(c) to ES Application No. P-201631737 filed on Dec. 30, 2016, entitled, "METHOD AND APPARATUS FOR COMPUTE END POINT BASED COLLECTIVE OPERATIONS", the entire contents of which are incorporated herein by reference.

TECHNICAL FIELD

Examples described herein are generally related to performing collective operations at a network switch and at one or more compute nodes included in a distributed architecture.

BACKGROUND

Demands by individuals, researchers, and enterprises for increased compute performance and storage capacity of computing devices have resulted in various computing technologies developed to address those demands. For example, compute intensive applications, such as enterprise cloud-based applications (e.g., software as a service (SaaS) applications), data mining applications, data-driven modeling applications, scientific computation problem solving applications, etc., typically rely on complex, large-scale computing environments (e.g., high-performance computing (HPC) environments, cloud computing environments, etc.) to execute the compute intensive applications, as well as store voluminous amounts of data. Such large-scale computing environments can include tens of hundreds (e.g., enterprise systems) to tens of thousands (e.g., HPC systems) of multi-processor/multi-core network nodes connected via high-speed interconnects (e.g., fabric interconnects in a unified fabric).

In some examples, to carry out such processor intensive computations, various computing technologies have been implemented to distribute workloads across different network computing devices or nodes. These computing technologies may include, but are not limited to, parallel computing or distributed computing. In support of such distributed workload operations, multiprocessor hardware architecture (e.g., multiple multi-core processors that share memory) has been developed to facilitate multiprocessing (i.e., coordinated, simultaneous or parallel processing by more than one processor) across local and remote shared memory systems using various parallel computer memory design architectures, such as non-uniform memory access (NUMA), and other distributed memory architectures.

DETAILED DESCRIPTION

In some examples, distributed computing architectures having tens of hundreds to tens of thousands of multi-processor/multi-core network nodes may operate such that information for a given application executed at one node may be stored across multiple interconnected computing nodes. For these examples, retrieving distributed information may be performed by broadcasting request messages via multicast techniques that may be capable of sending messages addressed to a group of target computing devices simultaneously. However, as distributed systems grow in size and scale, bandwidth and hardware (e.g., memory, processors, etc.) availability can become strained when collecting or gathering distributed information.

One recent solution includes implementing collective operations at a network switch coupled with a request compute node hosting the application requesting information in order to reduce an amount of data routed via a link between the request compute node and the network switch. This recent solution involved logic at the network switch to relay information requests via unicast techniques to respective targeted compute nodes identified by the request compute node as having distributed information. However, a large amount of network bandwidth may still be consumed if there are a relatively large number of target nodes and/or if distributed data is requested on a frequent basis. Thus, even with collective operations at the network switch, as distributed systems grow in size and scale, bandwidth and hardware availability may still be strained when collecting or gathering distributed information.

Figure 1:
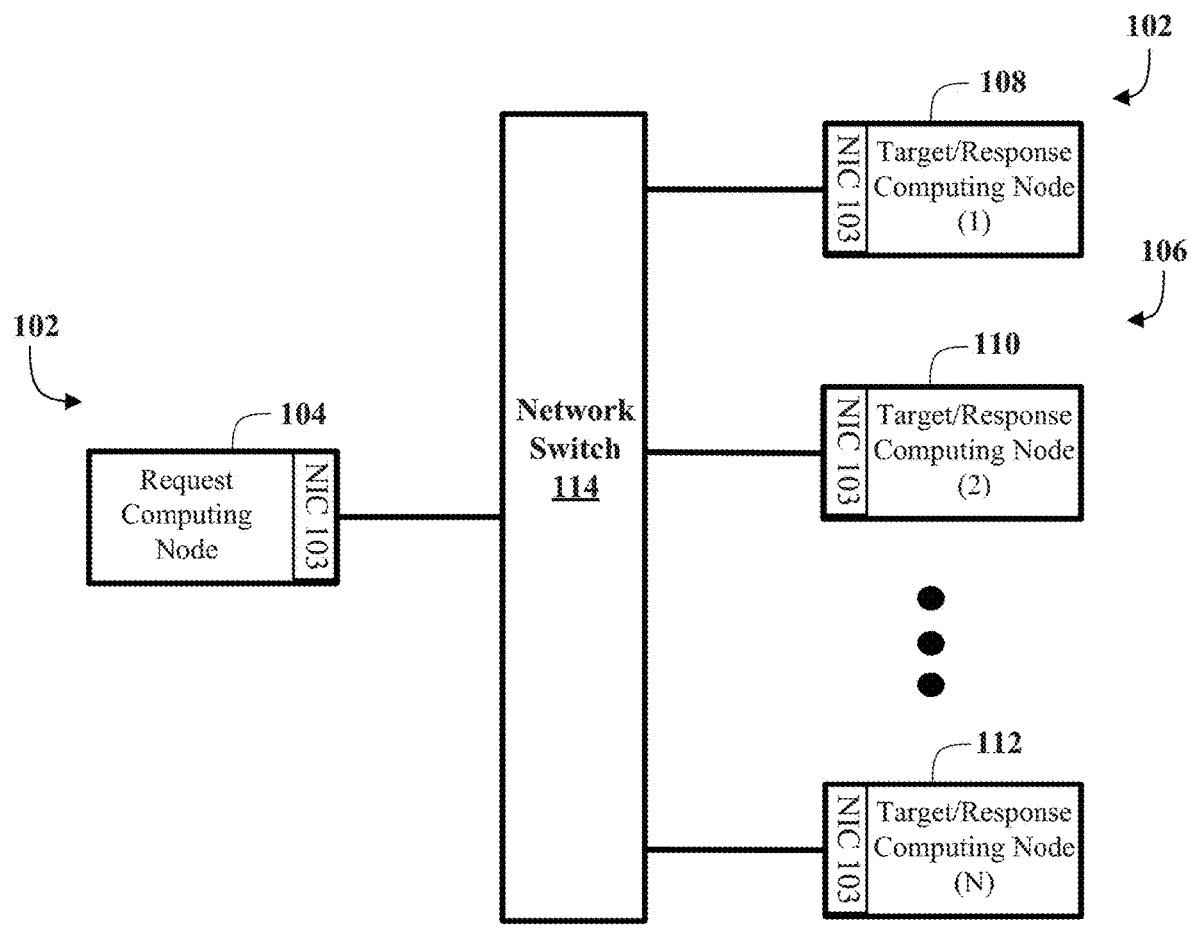
FIG. 1 illustrates an example system.

FIG. 1 illustrates an example system 100. In some examples, system 100 may be for performing both switch-based and target/response-based collective operations in a distributed architecture that includes multiple computing nodes 102 communicatively coupled via a series of fabric interconnects to a network switch 114. As shown in FIG. 1, computing nodes 102 may include a request computing node 104 communicatively coupled to an ingress side of the network switch 114 for receiving messages, as well as multiple target/response computing nodes 106 communicatively coupled to an egress side of the network switch 114 for transmitting messages. It should be appreciated that while the network switch 114 is referred to herein as having an ingress side interfacing with the request computing node 104 and an egress side interfacing with the target/response computing nodes 106, each of the ingress and egress sides are capable of transmitting and receiving network traffic (e.g., network packets, messages, datagrams, etc.) as described herein.

In some examples, as shown in FIG. 1, target/response computing nodes 106 may include a first response computing node, which is shown as target/response computing node (1) 108, a second target/response computing node, which is shown as target/response computing node (2) 110, and a third target/response computing node, which is shown as target/response computing node (N) 112 (i.e., the "Nth" target/response computing node of the target/response computing nodes 106, wherein "N" is a positive integer and designates one or more additional target/response computing nodes 106). It should be appreciated that, in other embodiments, there may be any number of computing nodes 102 (e.g., other request computing nodes 104, other target/response computing nodes 106, etc.) coupled to network switch 114 or another network switch similar to network switch 114 in the system 100. Accordingly, there may be multiple network switches in other examples. It should be further appreciated that, in such examples, multiple network switches may be connected, or daisy chained, to each other.

In some examples, as shown in FIG. 1, each computing node 102 includes a network interface card (NIC) 103. NIC 103 may include communication circuitry such as a host fabric interface (HFI) to enable computing nodes 102 to communicatively couple through network switch 114. Also, as described more below, collective logic (e.g., implemented by a field programmable gate array (FPGA)) may be a part of or coupled to a NIC such as NIC 103 to facilitate collective operations at target/response computing nodes 106.

According to some examples, as described more below, network switch 114 may receive a collective operation request message from request computing node 104 that includes respective collective operations for network switch 114 and target/response computing nodes 106 to calculate and return a result of a multilayered collective operation to request computing node 104. For example, collective operation request may be initiated by an application running on a host node, such as the request computing node 104 or another computing device communicatively coupled to the request computing node 104 (e.g., via a network router or another network switch 114).

In some examples, upon receiving a collective operation request message, network switch 114 identifies response/target computing nodes 106 at which further collective operations to collect data (e.g., variable values, operands, inputs, etc.) corresponding to the collective operation request are stored. For these examples, network switch 114 may transmit unicast respective "get" messages to identified target/response computing nodes 106. These respective "get" message may indicate collective endpoint operations (e.g., collective operation algorithms) to response/target computing nodes based on the operands, or expressions, of the operation. For example, a collective endpoint operation may be applied to a range of memory maintained at a target/response computing node in order to gather or collect data for use as operands. The range of memory, for example, may be associated with or assigned to one or more applications hosted by a given response/target computing node. Subsequently, each identified target/response computing node 106 may send its respective gathered or collected data to network switch 114 for further collective operations before sending a results back to request computing node 104 for the collective operation request message. It should be appreciated that the data corresponding to the operation to be requested may be prioritized based on operators of collective operations at network switch 114 and/or target/response computing nodes 106, such as may be based on the order of operations or other rules that may effectuate an order of precedence or priority of one or more data to be requested before one or more other data.

According to some examples, at both network switch 114 and target/response computing nodes 106, upon receiving requested data for gathering, logic and/or features at network switch 114 or target/response computing nodes 106 may perform a calculation on the operands, expressions, or sub-operation indicated in respective requested collective operations. For example, respective target/response computing nodes may be configured to iteratively repeat identification of targets for collective operations (e.g., memory ranges), the sending of "get" messages to obtain data from targets, and perform a subsequent calculation on the obtained data until a final result of the operation can be calculated and returned to Network switch 114. Also, network switch 114 may be configured to iteratively repeat identification of target/response computing nodes 106, transmit unicast "get" messages to request collective data from identified target/response computing nodes 106, and perform a subsequent calculation on the received data until a final result of the operation can be calculated and returned to request computing node 104. Accordingly, unlike present technologies that multicast "get" requests to multiple response computing nodes 106 by way of a traditional network switch and perform the calculation upon receiving a response to all of the "get" requests, the use of multi-layered collective operations at both target/response computing nodes 106 and at network switch 114 may substantially reduce pressure (i.e., network traffic) between the request computing node 104 and network switch 114 as well as between network switch 114 and target/response computing nodes 106 by limiting the number of messages transmitted there between, as well as reducing the load on cache, memory, and/or processor(s) of not only request computing node 104 but also of network switch 114.

In some examples, computing nodes 102 may be embodied as any type of compute and/or storage device that is capable of performing the functions described herein, such as, without limitation, a server (e.g., stand-alone, rack-mounted, blade, etc.), a network appliance (e.g., physical or virtual), a web appliance, a distributed computing system, and/or a multiprocessor-based system. As mentioned previously, computing nodes 102 may include request computing node 104 and target/response computing nodes 106; however, it should be appreciated that computing nodes 102 may include additional and/or alternative computing nodes, such as controller nodes, network nodes, utility nodes, etc., which are not shown to preserve clarity of the description.

Figure 2:
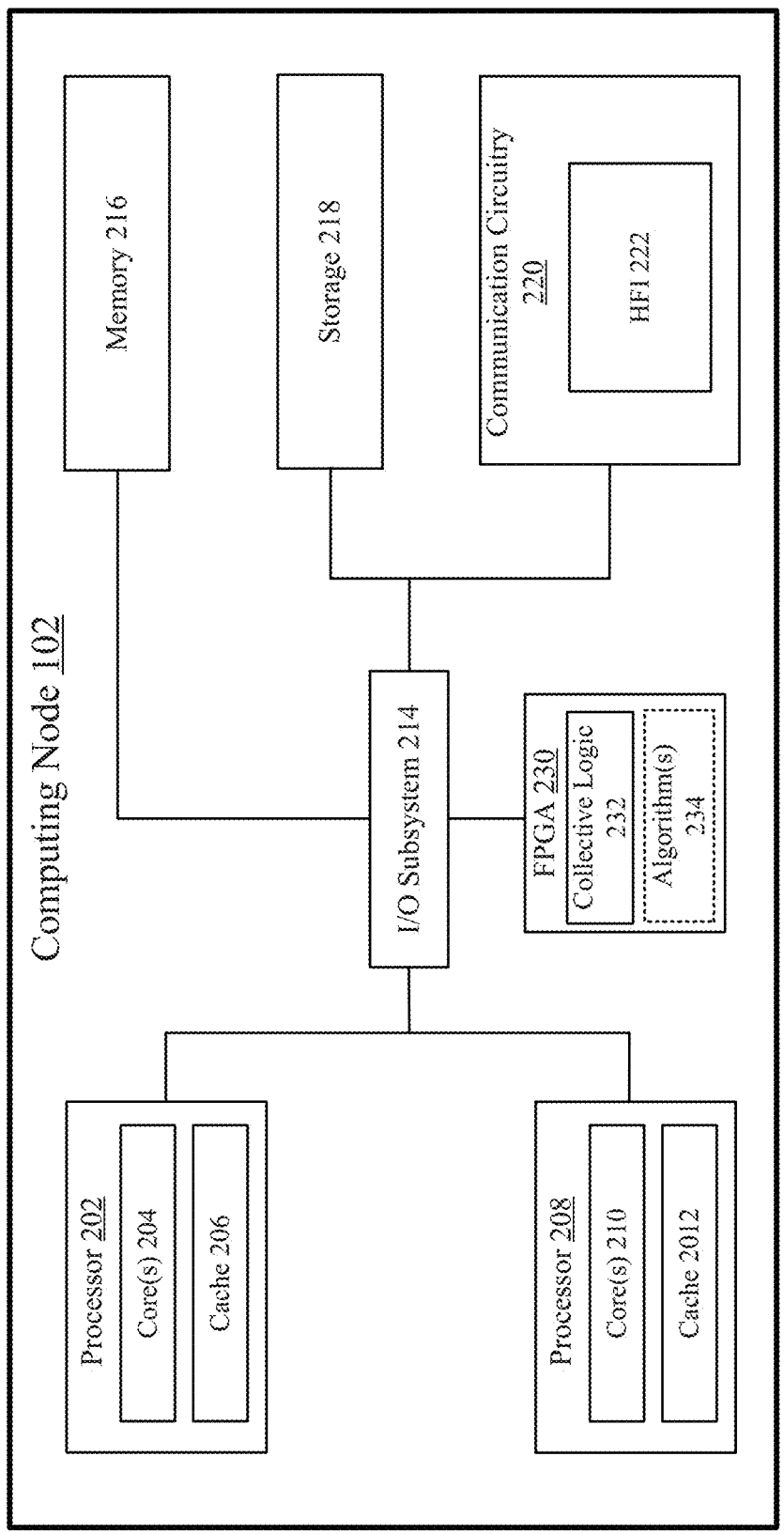
FIG. 2 illustrates an example block diagram of a computing node.

FIG. 2 illustrates an example block diagram of computing node 102. In some examples, as shown in FIG. 2, computing node 102 includes a first processor, designated as processor 202, a second processor, designated as processor 208, an input/output (I/O) subsystem 214, memory 216, storage 218, and communication circuitry 220. Of course, it should be appreciated that one or more of the computing nodes 102 may include other or additional components, such as those commonly found in a computing device (e.g., peripheral devices, other processing/storage hardware, etc.), in other embodiments. Additionally, in some examples, one or more of the components shown in FIG. 2 may be incorporated in, or otherwise form a portion of, another component. For example, cache memory of computing node 102 (e.g., cache memory 206, 212), or portions thereof, may be incorporated in one or both of the processors 202, 208. Further, in some examples, one or more of the illustrative components may be omitted from the computing node 102. For example, although computing node 102 is shown as including two processors 202, 208, the computing node 102 may include a greater number of processors in other embodiments.

According to some examples, each of the processors 202, 208 (i.e., physical processor packages) may be embodied as any type of multi-core processor capable of performing the functions described herein, such as, but not limited to, a single physical multi-processor core chip, or package. For example, processor 202 includes one or more processor core(s) 204, while processor 208 may similarly include one or more processor cores 210.

In some examples, processor core(s) 204, 210 may be separately embodied as an independent logical execution unit capable of executing programmed instructions. Processor core(s) 204, 210 may include a portion of cache memory (e.g., an L1 cache) and functional units usable to independently execute programs or threads. It should be appreciated that, in some examples of computing node 102 (e.g., supercomputers), computing node 102 may include thousands of processor cores. Each of the processors 202, 208 may be connected to a physical connector, or socket, on a motherboard (not shown) of the computing node 102 that is configured to accept a single physical processor package (i.e., a multi-core physical integrated circuit).

Figure 3:
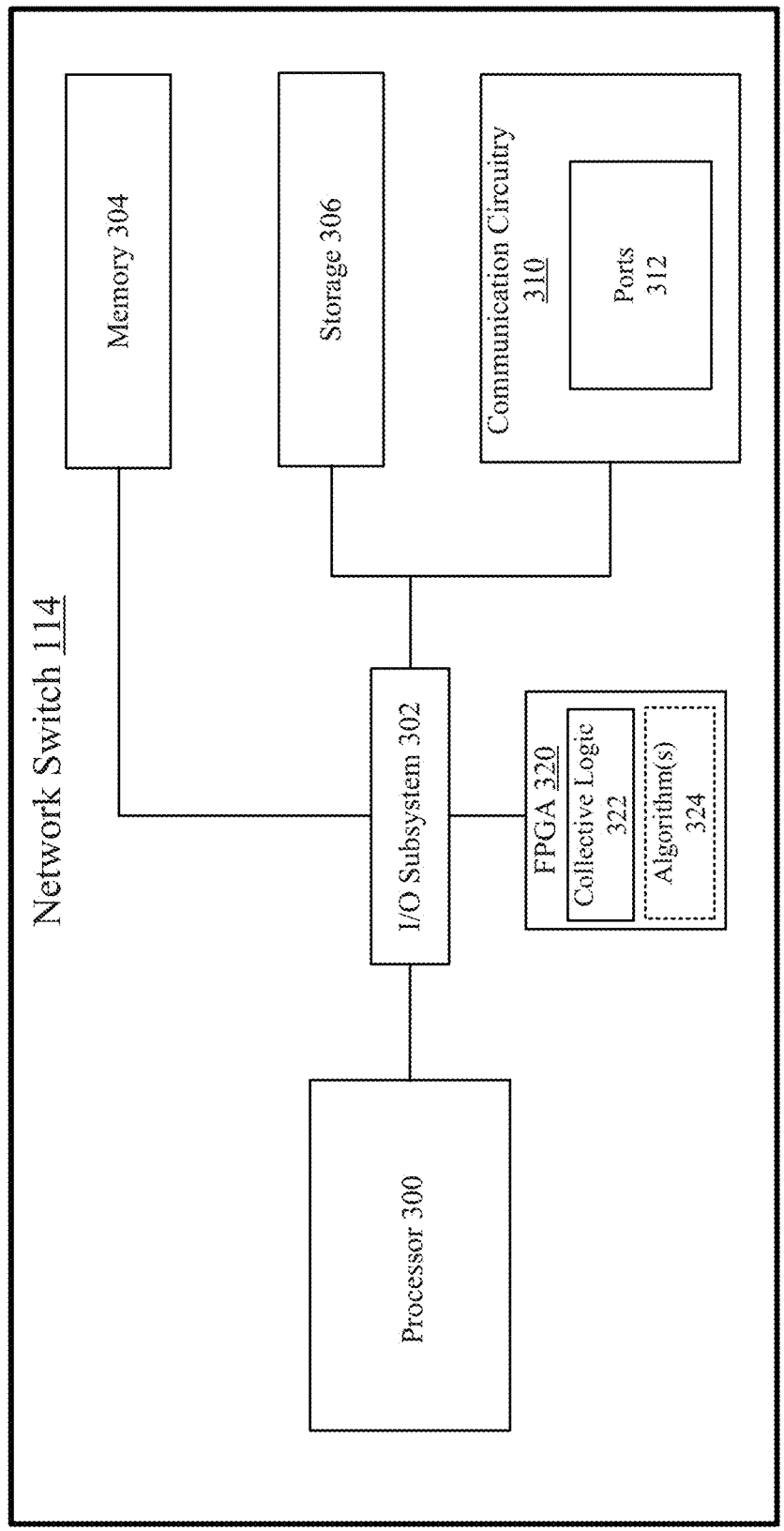
FIG. 3 illustrates an example block diagram of a network switch.

According to some examples, as shown in FIG. 3, processor 202 may additionally include a cache memory 206 and processor 208 may include a cache memory 212. Each cache memory 206, 212 may be embodied as any type of cache that respective processor 202, 208 may access more quickly than memory 216, such as an on-die or on-processor cache. In other examples, cache memory 206, 212 may be an off-die cache, but may reside on a same system-on-a-chip (SoC) as respective processor 202, 208. It should be appreciated that, in some examples, cache memory 206, 212 may have a multi-level architecture. In other words, in such multi-level architecture examples, cache memory 206, 212 may be embodied as one or more of an L1, L2, or L3 cache.

In some examples, memory 216 may be embodied as any type of volatile or non-volatile memory or data storage device capable of performing the functions described herein. In operation, memory 216 may store various data and software used during operation of the computing node 102, such as operating systems, applications, programs, libraries, and drivers. Memory 216 may be communicatively coupled to processors 202, 208 via I/O subsystem 214, which may be embodied as circuitry and/or components to facilitate input/output operations with processors 202, 208, memory 216, and other components of computing node 102. For example, I/O subsystem 214 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some examples, I/O subsystem 214 may form a portion of a SoC and may be incorporated, along with one or both of processors 202, 208, memory 216, and/or other components of computing node 102, on a single integrated circuit chip.

According to some examples, storage 218 may be composed of any type of storage device or devices configured for short-term or long-term storage of data such as, for example, memory devices and circuits, memory cards, hard disk drives, solid-state drives, or other types of storage devices. It should be appreciated that storage 218 and/or the memory 216 (e.g., the computer-readable storage media) may store various data as described herein, including operating systems, applications, programs, libraries, drivers, instructions, etc., capable of being executed by a processor (e.g., processor 202, processor 208, etc.) of computing node 102.

In some examples, communication circuitry 220 may include any communication circuit, device, or collection thereof, capable of enabling wireless and/or wired communications between computing node 102 and other computing devices (e.g., another computing node 102, network switch 114, etc.). Communication circuitry 220 may be configured to use one or more communication technologies (e.g., wireless or wired communication technologies) and associated protocols (e.g., Internet Protocol (IP), Ethernet, Bluetooth®, Wi-Fi®, WiMAX, LTE, 5G, etc.) to effect such communication.

According to some examples, as shown in FIG. 2, communication circuitry 220 may include a host fabric interface (HFI) 222. HFI 222 may be composed of one or more add-in-boards, daughter cards, NICs (e.g., similar to NIC 103), controller chips, chipsets, or other devices that may be used by computing node 102. For example, HFI 222 may be integrated with one or both of processors 202, 208 (e.g., on a coherent fabric within one or both of processors 202, 208), embodied as an expansion card coupled to I/O subsystem 214 over an expansion bus (e.g., PCI Express (PCIe)), part of a SoC that includes one or more processors, or included on a multichip package that also contains one or more processors. Additionally or alternatively, in some examples, functionality of HFI 222 may be integrated into one or more components of computing node 102 at the board level, socket level, chip level, and/or other levels. HFI 222 may be configured to facilitate transfer of data/messages to enable tasks executing on processors 202, 208 to access shared structures (e.g., shared physical memory) of other computing nodes 102, such as may be necessary during parallel or distributed computing operations as described herein.

In some examples, as shown in FIG. 2, computing node 102 also includes a field programmable gate array (FPGA) 230. FPGA 230 may be arranged or programmed to implement a collective logic 232 that may be capable of selecting or executing collective operations using one or more algorithm(s) 234. In some examples, algorithm(s) 234 may maintained at FPGA 230 or may be maintained with memory 216 or storage 218 and accessible to collective logic 232 (e.g., via I/O subsystem 214). Additionally or alternatively, in some examples, FPGA 230 may be integrated into one or more components of computing node 102 at the board level, socket level, chip level, and/or other levels in order to implement collective logic 230. For example, FPGA 230 may be integrated with communication circuitry 220 as part of a NIC included with or in addition to HFI 222. For this integrated example, FPGA 230 may enable the NIC and/or HFI 222 (e.g., NIC 103) to facilitate at least some aspects of collective operations.

As mentioned previously, computing nodes 102 may be embodied as compute nodes and/or storage nodes. Accordingly, it should be appreciated that those computing nodes 102 implemented as storage nodes may generally include more data storage capacity than those computing nodes 102 that are embodied as compute nodes. Similarly, it should also be appreciated that those computing nodes 102 implemented as compute nodes may generally include more processor capability that those computing nodes 102 implemented as storage nodes. In other words, the storage nodes may be embodied as physical servers including numerous hard-disk drives (HDDs) or solid-state drives (SDDs) relative to the number of storage devices of the compute nodes, whereas the compute nodes may be embodied as physical servers including numerous processors having multiple cores relative to the number of processors of the storage nodes. However, it should be further appreciated that any of the computing nodes 102 may be implemented as a compute node and/or a storage node, regardless of the component configuration relative to the other computing nodes 102.

Referring again to FIG. 1, network switch 114 may be embodied as any type of switching device (e.g., a crossbar switch) capable of forwarding network traffic through a fabric (e.g., via fabric interconnects) in a switched, or switching, fabric architecture, such as a switch (e.g., rack-mounted, standalone, fully managed, partially managed, full-duplex, and/or half-duplex communication mode enabled, etc.), a router, etc. As mentioned previously, network switch 114 may rely on fabric interconnects to communicatively couple the network switch 114 to a number of respective computing nodes 102. The fabric interconnects may be embodied as one or more buses, switches, and/or networks configured to support transmission of network traffic as a function of various interconnect protocols and/or network protocols. In use, these fabric interconnects may be utilized by computing nodes 102 (e.g., via respective HFIs 222) to communicate with network switch 114 and the other computing nodes 102 (i.e., across the interconnect fabric). According to some examples, computing nodes 102 and network switch 114 may be capable of using non-standardized and/or proprietary-based communication protocols such as, but not limited to, Intel® Corporation's Storm Lake (STL) Fabric Technology using a fabric architecture such as, but not limited to, the Intel® Omni-Path architecture (Intel® OPA), herein referred to as "the Omni-Path architecture or model".

FIG. 3 illustrates an example block diagram of network switch 114. In some examples, as shown in FIG. 3, similar to computing node 102 shown in FIG. 2, switch 114 includes a processor 300, an I/O subsystem 302, a memory 304, a data storage device 306, communication circuitry 310 and an FPGA 320. As such, further descriptions of the like components are not repeated herein with the understanding that the description of the corresponding components provided above in regard to computing node 102 shown in FIG. 2 applies equally to the corresponding components of network switch 114 shown in FIG. 3. Of course, it should be appreciated that network switch 114 may include other or additional components, such as those commonly found in a network traffic or fabric switching device (e.g., peripheral devices, other processing/storage hardware, etc.), in other examples. Additionally, in some examples, one or more of the illustrative components may be incorporated in, or otherwise form a portion of, another component. Further, in some embodiments, one or more of the illustrative components may be omitted from the network switch 114.

In some examples, as shown in FIG. 3, communication circuitry 310 may include multiple switch ports 312 (i.e., input/output ports) for transmitting and receiving data to/from network switch 114. Accordingly, in some examples, network switch 114 may be configured to create a separate collision domain for each of switch ports 312. As such, depending on the network design of network switch 114 and the operation mode (e.g., half-duplex, full-duplex, etc.), it should be appreciated that each of computing nodes 102 connected to one of the switch ports 312 of network switch 114 may be configured to transfer data to any of other computing nodes 102 at any given time, and the transmissions should not interfere, or collide.

According to some examples, similar to computing node 102, network switch 114 may include an FPGA having collective logic. For example, FPGA 330 may be arranged or programmed to implement a collective logic 322 that may be capable of receiving and executing collective operations using one or more algorithm(s) 324. In some examples, algorithm(s) 324 may maintained at FPGA 320 or may be maintained with memory 304 or storage 308 and accessible to collective logic 322 (e.g., via I/O subsystem 302). Additionally or alternatively, in some examples, FPGA 320 may be integrated into one or more components of network switch 114 at the board level, socket level, chip level, and/or other levels in order to implement collective logic 322.

Figure 4:
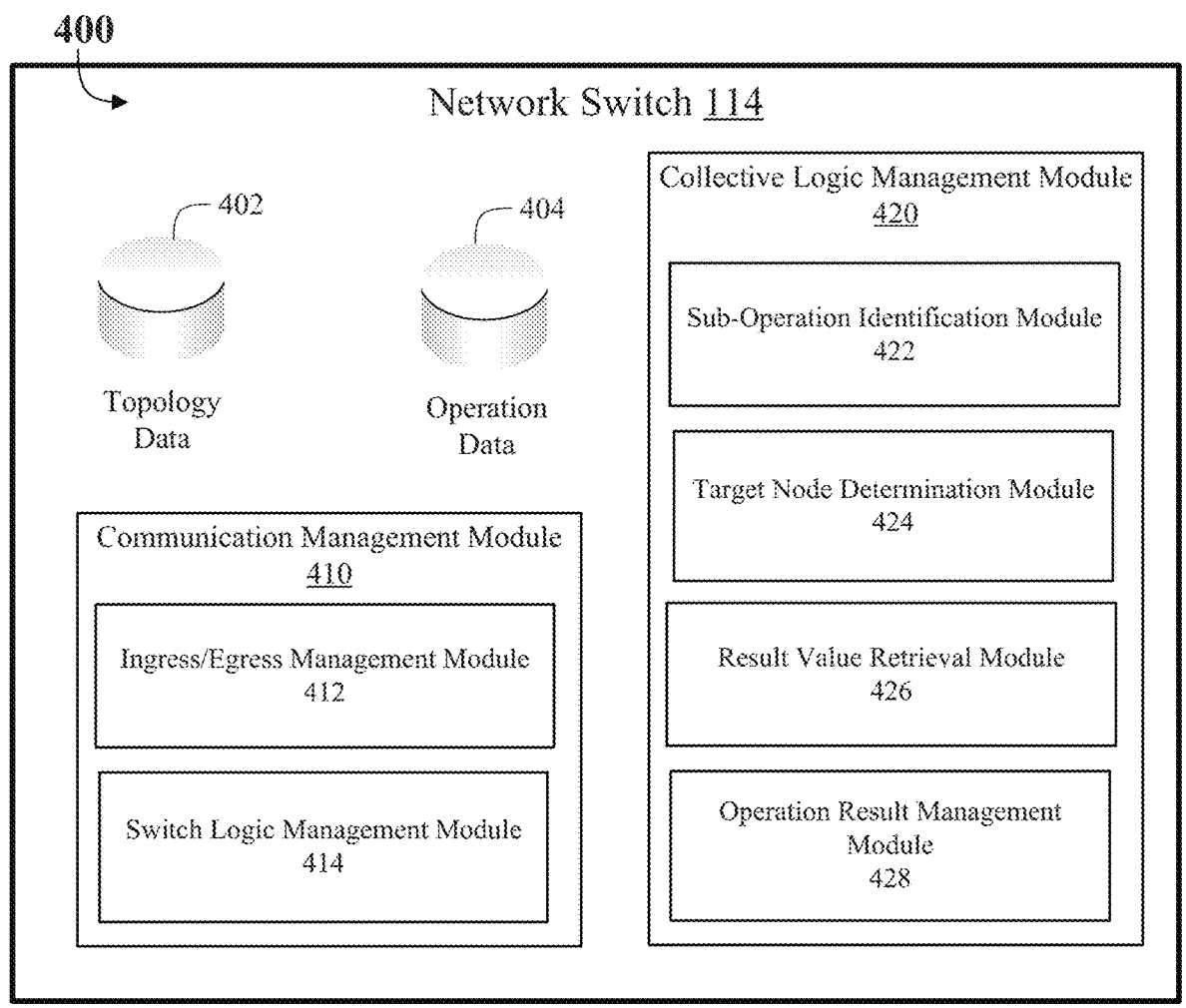
FIG. 4 illustrates an example block diagram of an environment for the network switch.

FIG. 4 illustrates an example block diagram of an environment for network switch 114. In some examples, network switch 114 may establish an environment 400 during operation. As shown in FIG. 4, environment 400 includes a communication management module 410 and a collective logic management module 420. The various modules of environment 400 may be embodied as hardware, firmware, software, or a combination thereof. As such, in some embodiments, one or more of the modules of environment 400 may be embodied as circuitry having logic or collection of electrical devices (e.g., a communication management circuit 410, a collective logic management circuit 420, etc.).

According to some examples, one or more of the communication management module 410 and collective logic management module 420 may form a portion of processor 300, I/O subsystem 302, communication circuitry 310, FPGA 320 and/or other components of network switch 114. Additionally, in some embodiments, one or more of the modules shown in FIG. 4 may form a portion of another module and/or one or more of the illustrative modules may be independent of one another. Further, in some examples, one or more of the modules of environment 400 may be embodied as virtualized hardware components or emulated architecture, which may be established and maintained by the one or more processors and/or other components of network switch 114.

In some examples, as shown in FIG. 4, environment 400 for network switch 114 may further include topology data 402 and operation data 404, each of which may be stored in memory 304 and/or storage 306 of network switch 114. Further, topology data 402 or operation data 404 may be accessed by the various modules and/or sub-modules of network switch 114. Additionally, it should be appreciated that in some examples data stored in, or otherwise represented by, topology data 402 or operation data 404 may not be mutually exclusive relative to each other. For example, in some implementations, data stored in topology data 402 may also be stored as a portion of operation data 404, and/or vice versa. As such, although the various data utilized by network switch 114 is described herein as particular discrete data, such data may be combined, aggregated, and/or otherwise form portions of a single or multiple data sets, including duplicative copies. It should be further appreciated that network switch 114 may include additional and/or alternative components, sub-components, modules, sub-modules, and/or devices commonly found in a computing device, which are not illustrated in FIG. 4 for clarity of the description.

According to some examples, communication management module 410, which may be composed of hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from network switch 114. To do so, communication management module 410 is shown in FIG. 4 as including an ingress/egress management module 412 and a switch logic management module 414. It should be appreciated that ingress/egress management module 412 or switch logic management module 414 of communication management module 410 may be separately composed of hardware, firmware, software, virtualized hardware, emulated architecture, and/or a combination thereof. For example, ingress/egress management module 412 may be embodied as a hardware component, while the switch logic management module 414 may be embodied as a virtualized hardware component or as some other combination of hardware, firmware, software, virtualized hardware, emulated architecture, and/or a combination thereof.

In some examples, ingress/egress management module 412 may be configured to receive and process network packets from computing nodes 102 connected to network switch 114, such as request computing node 104, or other network switches, via fabric interconnects. To do so, ingress/egress management module 412 may be configured to enqueue received network traffic in input buffers associated with input ports of network switch 114. Additionally, ingress/egress management module 412 may be configured to prepare and transmit network packets to other computing nodes 102, such as target/response computing nodes 106, or other network switches, via the fabric interconnects. To do so, ingress/egress management module 412 may be configured to dequeue network traffic from output buffers associated with output ports of network switch 114. It should be appreciated that, in some examples, one or more of the output buffers may logically belong to a respective one of the output ports, but may physically be present in another location (e.g., another component) within network switch 114.

According to some examples, switch logic management module 414, which may be composed of hardware, firmware, software, virtualized hardware, emulated architecture, and/or a combination thereof as discussed above, may be configured to manage the internal path logic of network switch 114. In other words, switch logic management module 414 may be configured to route, or forward network traffic through network switch 114. For example, switch logic management module 414 may determine an appropriate target computing device or node (e.g., a computing node 102, another network switch, etc.) for a received network packet and transfer the received network packet from an input buffer of an input port of network switch 114 to an output buffer of an output port of network switch 114 that corresponds to a path usable to route the received network packet through the fabric architecture to a desired destination computing device or node (e.g., computing node 102 directly coupled to network switch 114 or computing node 102 remotely coupled to network switch 114 via another network switch).

It should be appreciated that at least a portion of the functionality of communication management module 410 may be performed by communication circuitry 310 of network switch 114. In some examples, data usable to communicate with the other computing nodes 102 or other network switches of the fabric architecture, such as IP address information, flow information, etc., may be stored in topology data 402.

In some examples, collective logic management module 420, which may be composed of hardware, firmware, software, virtualized hardware, emulated architecture, and/or a combination thereof as discussed above, may be configured to manage collective logic. To do so, collective logic management module 420 is shown in FIG. 4 as including a sub-operation identification module 422, a target node determination module 424, a result value retrieval module 426, and an operation result management module 428. It should be appreciated that sub-operation identification module 422, target node determination module 424, result value retrieval module 426, or operation result management module 428 of the collective logic management module 420 may be separately composed of hardware, firmware, software, virtualized hardware, emulated architecture, and/or a combination thereof. For example, sub-operation identification module 422 may be embodied as a hardware component (e.g., implemented by FPGA 320), while one or more of target node determination module 424, result value retrieval module 426 or operation result management module 428 may be embodied as a virtualized hardware component or as some other combination of hardware, firmware, software, virtualized hardware, emulated architecture, and/or a combination thereof.

According to some examples, sub-operation identification module 422 may be configured to determine a number of sub-operations of a received collective operation request. For example, sub-operation identification module 422 may analyze an operation of a received to collective operation request to determine a number of sub-operations (e.g., operands, variables, inputs, etc.) associated with the operation and prioritize the sub-operations for corresponding result value retrieval, such as may be prioritized based on the order of operations. Target node determination module 424 may be configured to determine in which of computing nodes 102 corresponding result value(s) of the sub-operations are to be gathered by respective collective logic at computing nodes 102. Result value retrieval module 426 is configured to generate result value request messages (e.g., unicast messages) and transmit the result value request messages to the determined computing nodes 102. Result value retrieval module 426 may be further configured to receive result responses to the transmitted value request messages and parse the received responses for the returned result values.

In some examples, operation result management module 428 may be configured to determine a result of each sub-operation performed at network switch 114 based on returned result values and the applicable operator(s), as well as a total result of a collective operation based on the result of each sub-operation performed at network switch 114. In some examples, the returned result values, the result of each sub-operation, and/or the total result of the received operations may be stored in operation data 404. For example, operation data 404 may include a table usable to track response result values as wells as results of the sub-operation performed at network switch 114. Operation result management module 428 may be configured to manage the table (e.g., add values to the table, remove values from the table, update values of the table, etc.). In other examples, received response result values from target/response computing nodes may be stored in a register, while data to track and store response messages may be stored in the table. In some examples, operation result management module 428 may be configured to interface with an arithmetic logic unit of network switch 114 (not shown) that may be capable of operating on two or more values at a time.

Figure 5:
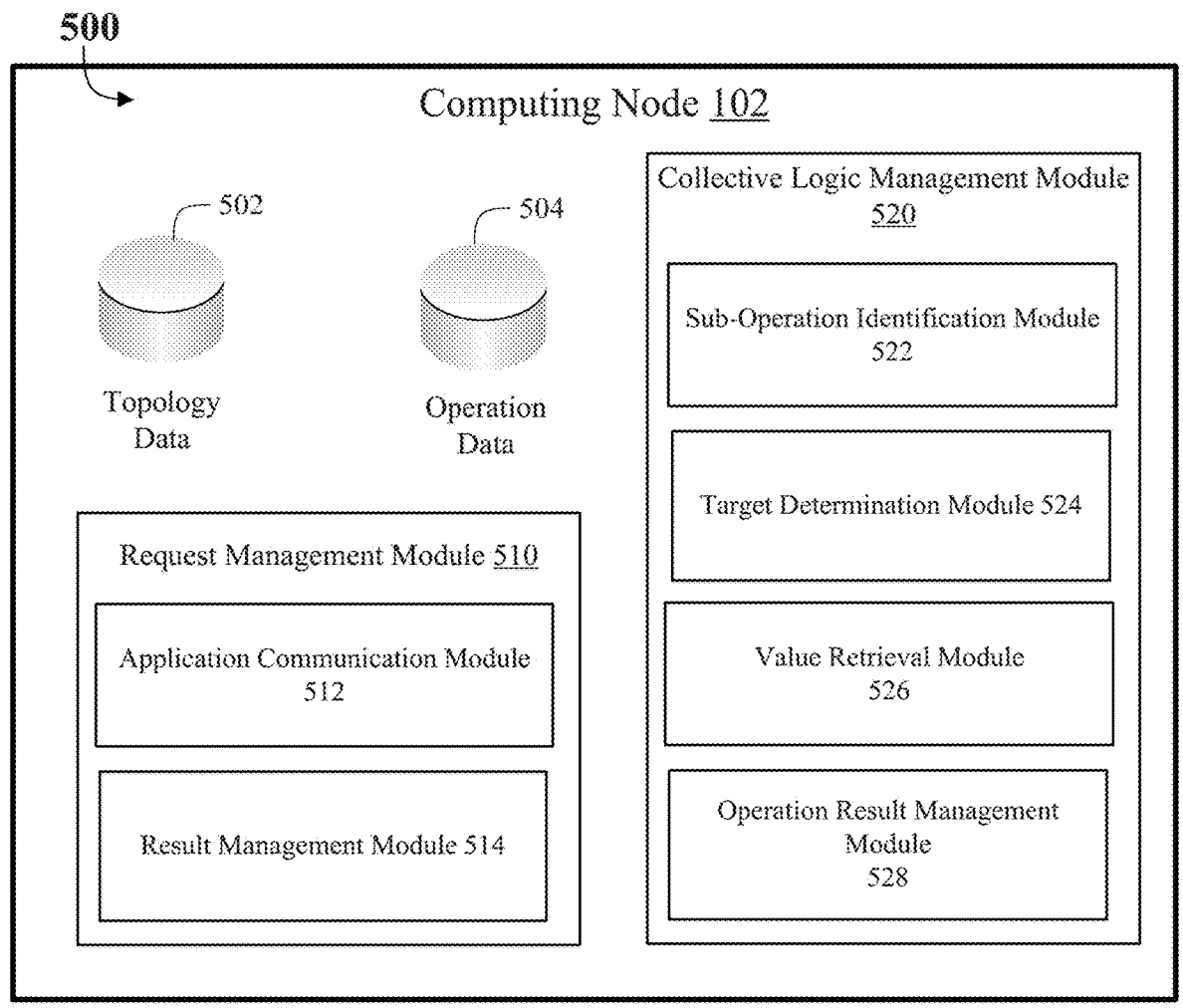
FIG. 5 illustrates an example block diagram of an environment for the computing node.

FIG. 5 illustrates an example block diagram of an environment for computing node 102. In some examples, compute node may establish an environment 500 during operation as either a requesting compute node or as a target/response compute node. As shown in FIG. 5, environment 500 includes a request management module 510 and a collective logic management module 520. The various modules of environment 500 may be embodied as hardware, firmware, software, or a combination thereof. As such, in some embodiments, one or more of the modules of environment 500 may be embodied as circuitry including logic or collection of electrical devices (e.g., a request management circuit 510, a collective logic management circuit 520, etc.).

According to some examples, one or more of the request management module 510 and collective logic management module 520 may form a portion of processor 202, processor 208, I/O subsystem 214, communication circuitry 220, FPGA 230 and/or other components of computing node 102. Additionally, in some embodiments, one or more of the modules shown in FIG. 5 may form a portion of another module and/or one or more of the illustrative modules may be independent of one another. Further, in some examples, one or more of the modules of environment 500 may be embodied as virtualized hardware components or emulated architecture, which may be established and maintained by the one or more processors and/or other components of computing node 102.

In some examples, as shown in FIG. 5, environment 500 for computing node 102 may further include topology data 502 and operation data 504, each of which may be stored in memory 216 and/or storage 218 of computing node 102. Further, topology data 502 or operation data 504 may be accessed by the various modules and/or sub-modules of computing node 102. Additionally, it should be appreciated that in some examples data stored in, or otherwise represented by, topology data 502 or operation data 504 may not be mutually exclusive relative to each other. For example, in some implementations, data stored in topology data 402 may also be stored as a portion of operation data 504, and/or vice versa. As such, although the various data utilized by computing node 102 is described herein as particular discrete data, such data may be combined, aggregated, and/or otherwise form portions of a single or multiple data sets, including duplicative copies. It should be further appreciated that computing node 102 may include additional and/or alternative components, sub-components, modules, sub-modules, and/or devices commonly found in a computing device, which are not illustrated in FIG. 5 for clarity of the description.

According to some examples, request management module 510, which may be composed of hardware, firmware, software, virtualized hardware, emulated architecture, and/or a combination thereof as discussed above, is configured to facilitate collective operation requests when computing node 102 hosts applications requesting data maintained or generated at other computing nodes. To do so, request management module 510 is shown in FIG. 5 as including an application communication management module 512 and result management module 514. It should be appreciated that application management module 512 or result management module 514 of result management module 510 may be separately composed of hardware, firmware, software, virtualized hardware, emulated architecture, and/or a combination thereof.

In some examples, application management module 510 may be capable of exposing software or applications hosted by computing node 102 to what types of collective operations that may be supported by network switches and computing nodes interconnected to a fabric as mentioned above for system 100. For example, supported operations may change from one generation/implementation of a fabric to a next. Therefore, a mechanism to discover what is supported may be desired. The mechanism may include, for example, exposing one or more machine state registers (MSRs—not shown) to a requesting application hosted by computing node 102 for the requesting application to determine what is supported. Application module 510 may also be arranged to receive requests for data or results maintained or generated at target/response computing nodes 106 accessible through network switch 114.

According to some examples, application management module 510 may also be capable of providing information (e.g., maintained in topology data 502 and/or operation data 504) to facilitate requests from applications hosted by computing node 102. For example, a list of target/response computing nodes 106 maintaining data or generating results or values of interest to applications. A list of handles/parameter/addresses that may be passed to respective target/response computing nodes 106 to cause these target/response computing nodes 106 to provide the results or values of interest. Information may also include one or more algorithms for network switch 114 and each target/response computing node 106 to perform in order to complete collective operations.

In some examples, result management module 514 may be arranged to communicate collected results to requesting applications responsive to receiving data or results. For these examples, the data or results may be obtained via multilayered collective operations. As described more below, multilayered collective operations may include a first layer of collective operations at respective target/response computing nodes 106 and a second layer at a network switch 114 coupled between requesting computing node 104 and the respective target/response computing nodes 106.

It should be appreciated that at least a portion of the functionality of request management module 510 may be performed by communication circuitry 220 of computing node 102. In some examples, data usable to communicate with the other computing nodes 102 or network switches such as network switch 114, such as IP address information, flow information, etc., may be stored in topology data 402.

In some examples, collective logic management module 520, which may be composed of hardware, firmware, software, virtualized hardware, emulated architecture, and/or a combination thereof as discussed above, may be configured to manage collective logic when computing node 102 is functioning as a target/response computing node 106. To do so, collective logic management module 520 is shown in FIG. 5 as including a sub-operation identification module 522, a target determination module 524, a value retrieval module 526, and an operation result management module 528. It should be appreciated that sub-operation identification module 522, target node determination module 524, result value retrieval module 526, or operation result management module 528 of the collective logic management module 520 may be separately composed of hardware, firmware, software, virtualized hardware, emulated architecture, and/or a combination thereof. For example, sub-operation identification module 522 may be embodied as a hardware component (e.g., implemented by FPGA 230), while one or more of target determination module 524, result value retrieval module 526 or operation result management module 528 may be embodied as a virtualized hardware component or as some other combination of hardware, firmware, software, virtualized hardware, emulated architecture, and/or a combination thereof.

According to some examples, sub-operation identification module 522 may be configured to determine a number of sub-operations of a received collective operation request. For example, sub-operation identification module 522 may analyze an operation of a received collective operation request to determine a number of sub-operations (e.g., operands, variables, inputs, etc.) associated with the operation and prioritize the sub-operations for corresponding value retrieval, such as may be prioritized based on the order of operations. Target determination module 524 may be configured to determine where to obtain target data or values from targets located at target/response computing nodes. Result value retrieval module 526 may be configured to generate value request messages and send these value request messages to the determined targets. Value retrieval module 526 may be further configured to receive result responses to the transmitted value request messages and parse the received responses for the returned result values.

In some examples, operation result management module 528 may be configured to determine a result of each sub-operation performed at computing node 102 when functioning as a target/response computing node 106. The result may be based on values returned from targets and the applicable operator(s), as well as a total result of a collective operation based on the result of each sub-operation performed at computing node 102. In some examples, the returned values, the result of each sub-operation, and/or the total result of the received operations may be stored in operation data 504. For example, operation data 504 may include a table usable to track response values as wells as results of the sub-operation performed at computing node 102. Operation result management module 528 may be configured to manage the table (e.g., add values to the table, remove values from the table, update values of the table, etc.). In other examples, received response values may be stored in a register, while data to track and store response messages from targets may be stored in the table. In some examples, operation result management module 528 may be configured to interface with an arithmetic logic unit of computing node 102 (not shown) that may be capable of operating on two or more values at a time.

Figure 6:
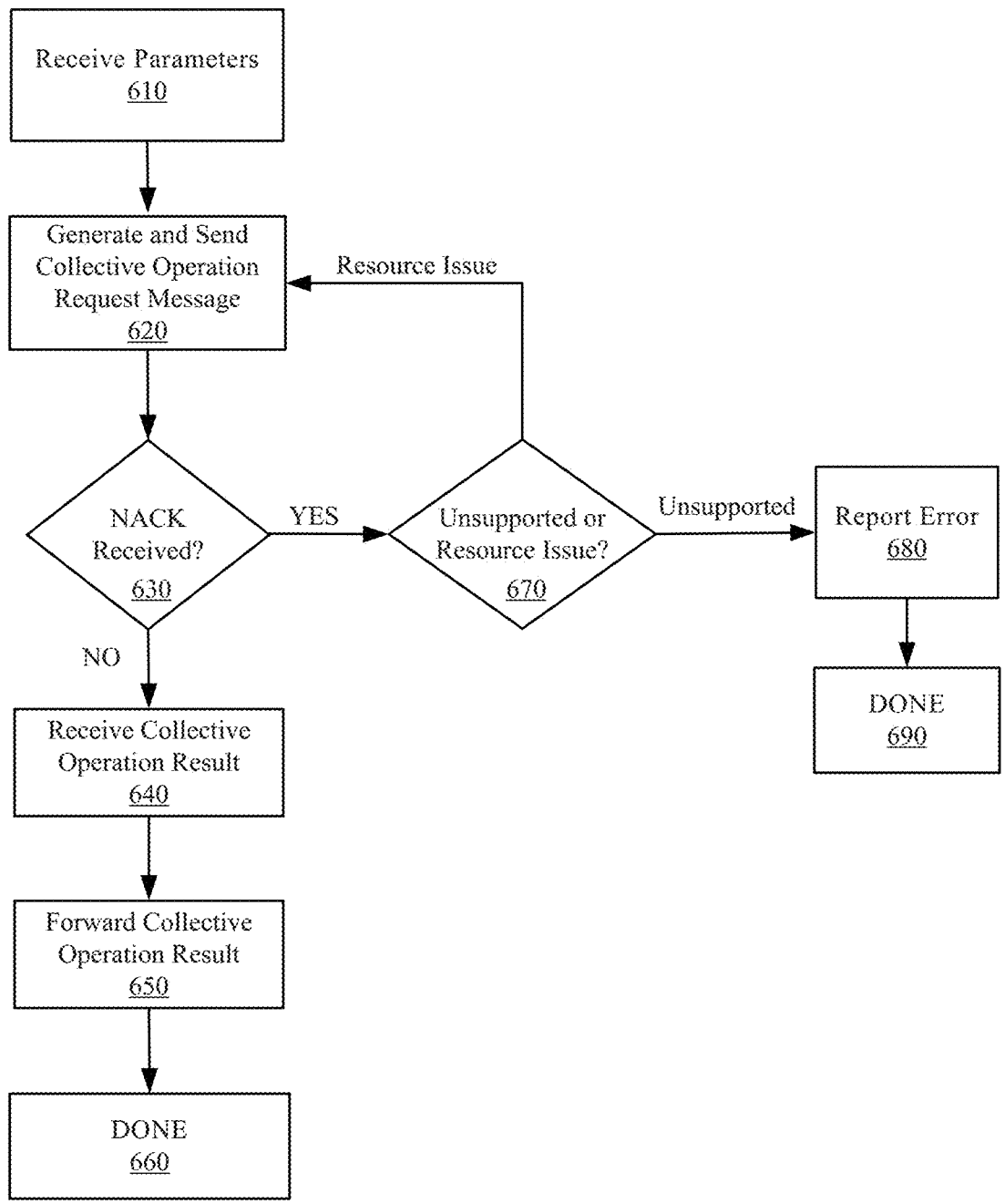
FIG. 6 illustrates an example of a first logic flow.

FIG. 6 illustrates an example logic flow 600. In some examples, at least portions of logic flow 600 may be implemented by modules, logic and/or features at a computing node 102 functioning as a request computing node 104 such as request management module 510 shown in FIG. 5 for environment 500. For these examples, computing node 102 may function as a request computing node 104 and may be arranged to host one or more applications that may request data from target/response computing nodes 106 coupled through network switch 114 as shown in FIG. 1. However, logic flow 600 is not limited to being implemented by request management module 510 shown in FIG. 5 for environment 500.

Beginning at block 610, application communication module 512 of request management module 510 may receive parameters. In some examples, the parameters may be included in a request from an application hosted by computing node 102 to obtain data from a plurality of target/response computing nodes. For these examples, a requestor application may want to perform collective operations at each target/response computing node to gather or obtain that data. Each collective operation may include generating separate results using a set of values stored at or accessible to the plurality of target/response computing nodes. For example, parameters, {(@1, Node 1), . . . (@n, Node n)}, where "@x" may be a given memory address at memory or storage located at or accessible to a given target/response computing "NodeX". These parameters may be sent by the requestor application to obtain the data from the plurality of target/response computing nodes.

At block 620, result management module 514 of request management module 510 may generate a collective operation request message that includes parameters specified by the requestor application. Result management module 514 may also include information in the collective operation request message to cause network switch 114 to send respective unicast messages to each target/response computing node 106. The respective unicast message may further cause or direct these target/response computing nodes 106 to perform their own respective collective operations to gather data that may include generating one or more results based on gathered operands inputted in specified algorithms. Information included in the collective operation request message may also indicate a collective operation performed by network switch 114 as results are received from each of the target/response computing nodes. These results may then be used as operands inputted in one or more further specified algorithms. Thus, for these examples, information included in the collective operation request message may enable network switch 114 and respective target/response computing nodes to implement multilayered collective operations.

At decision block 630, if result management module 514 does not receives a negative acknowledgment (NACK) message from network switch 114 following the sending of the collective operation request message, logic flow 600 moves to block 640. Otherwise, logic flow 600 moves to decision block 670.

At block 640, result management module 514 may receive a collective operation result from network switch 114. In some examples, the collective operation result includes multiple results gathered at target/response computing nodes 104 and then gathered at network switch 114 and sent to request computing node 104 as a single collective operation result. In some examples, if one or more target/response computing nodes were unable to support their respective collective operations (e.g., indicated by NACK messages sent responsive to received unicast messages), network switch 114 may also indicate these non-supporting target/response computing nodes with the single collective operation result.

At block 650, application communication module may forward the received collective operation result to the requesting application.

At block 660, logic flow 600 is done.

At decision block 670, responsive to receiving a NACK message from network switch 114, result management module 514 determine whether the NACK message indicates whether network switch 114 does not support the collective operation or whether network switch 114 temporarily lacks resources to perform the collective operation. If a resource issue, logic flow 600 moves to block 620 whereby result management module 514 may generate and resend the collective operation request message at a later time. If unsupported, logic flow 600 moves to block 680.

At block 680, application communication module 512 may send a report error to the requestor application that indicates the requested collective operation is not supported by network switch 114.

At block 690, logic flow 600 is done.

Figure 7A:
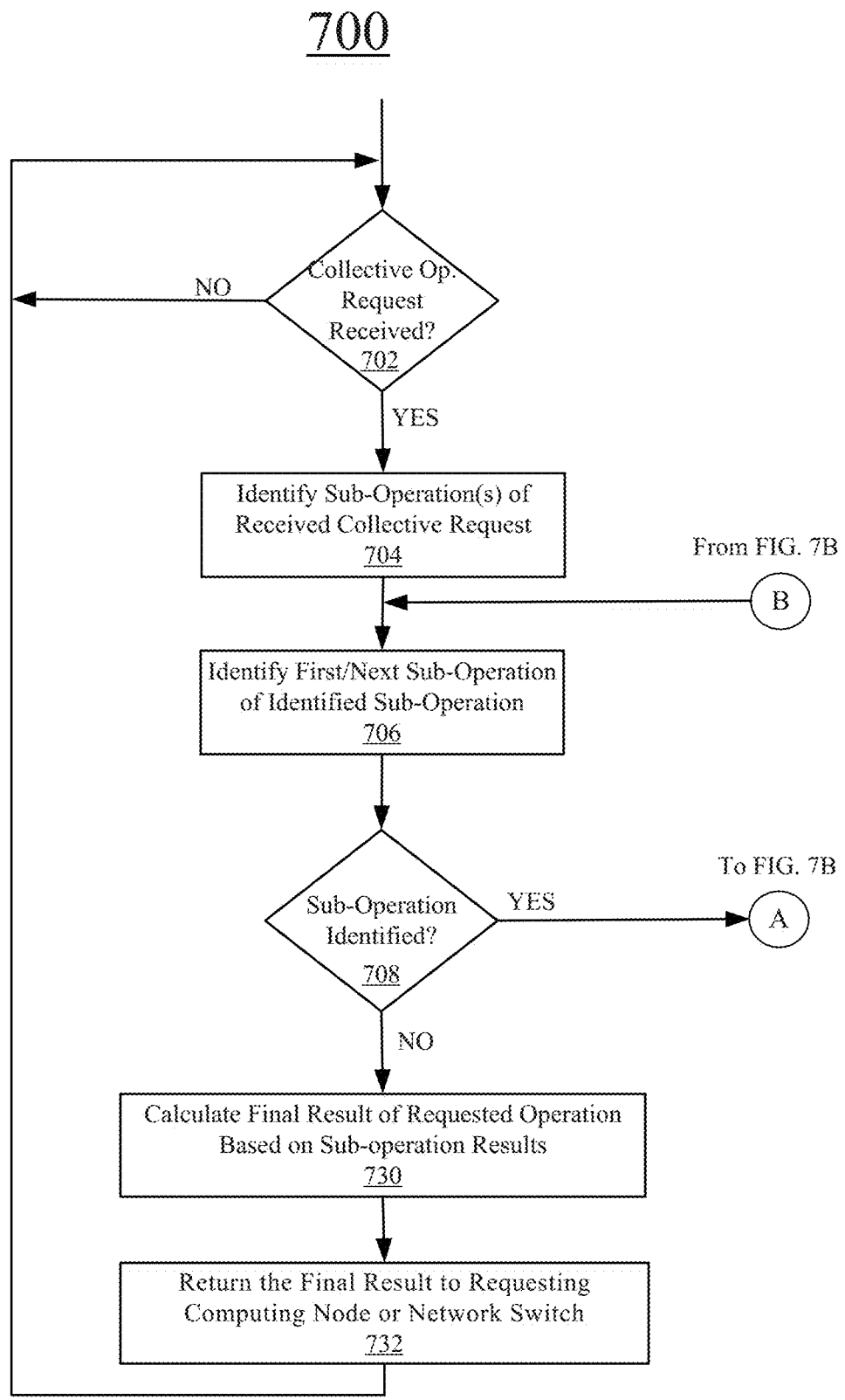
FIGS. 7A-B illustrate an example of a second logic flow.
Figure 7B:
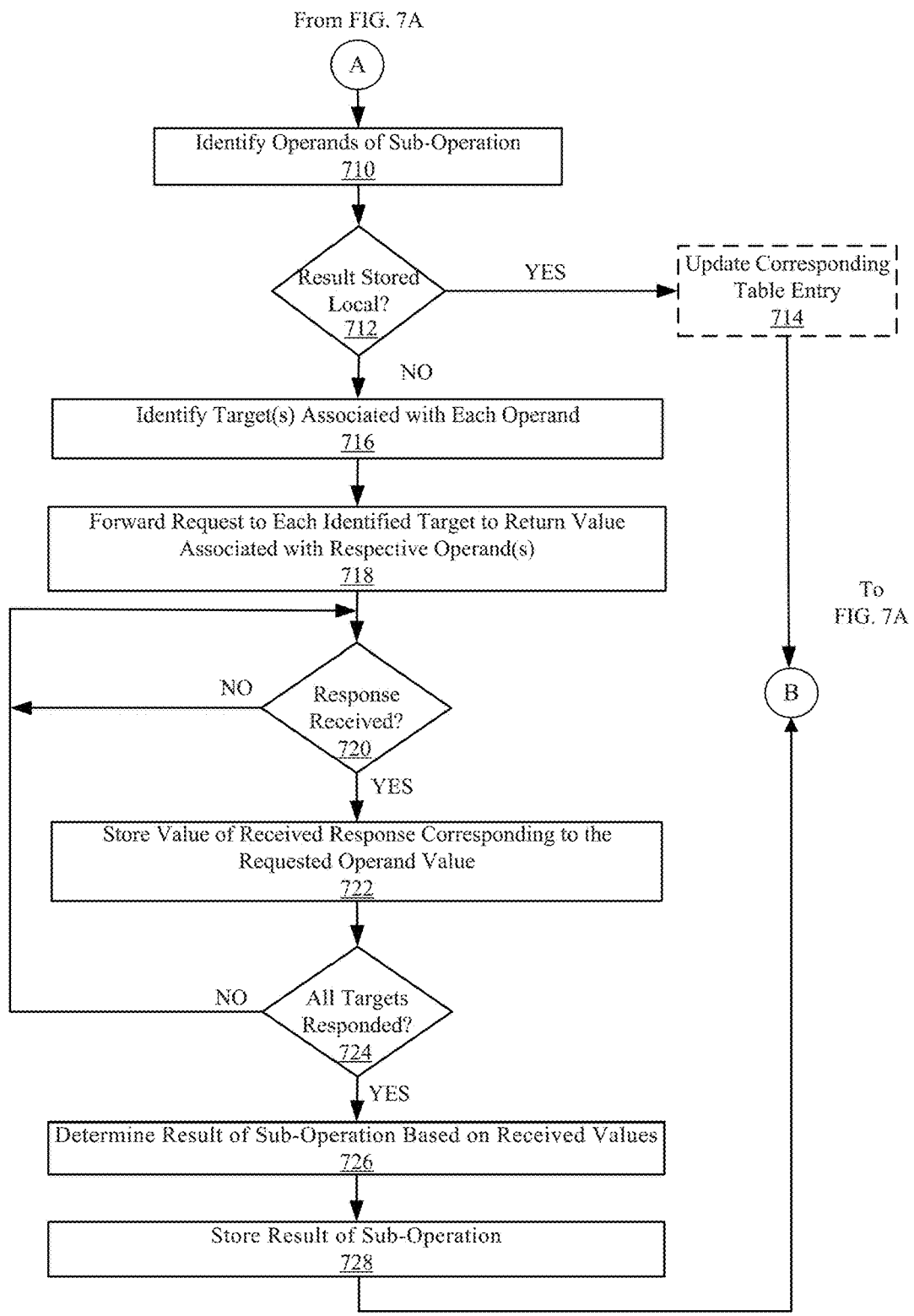

FIGS. 7A-B illustrate an example flow 700. In some examples, logic flow 700 may represent collective operations performed at either network switch 114 or respective target/response computing nodes 106 responsive to a collective operation request message sent from a request computing node 104. For examples of collective operations performed by network switch 114, modules, logic and/or features of network switch 114 such as those of collective logic management module 420 shown in FIG. 4 for environment 400 may be arranged to implement logic flow 700. For examples of collective operations performed by target/response computing nodes 106, modules, logic and/or features of computing node 102 such as those of collective logic management module 520 shown in FIG. 5 for environment 500 may be arranged to implement logic flow 700. However, logic flow 700 is not limited to being implemented by these collective logic management modules for environments 400 or 500 as shown in FIGS. 4-5. [0069] Logic flow 700 begins at decision block 702, in which network switch 114 or target/response computing node 106 determines whether a collective operation request has been received. As described previously, the collective operation request may be initiated by an application running on request computing node 104.

If a collective operation request has not been received, logic flow 700 loops back to decision block 702 to determine whether a collective operation request has been received; otherwise, the logic flow 700 advances to block 704. At block 704, network switch 114 or target/response computing node 106 identifies one or more sub-operations of the collective operation request received in decision block 702. In block 706, network switch 114 or target/response computing node 106 identifies a first sub-operation of the one or more sub-operations of the collective operation request identified in block 704. In some examples, network switch 114 or target/response computing node 106 may prioritize the sub-operations, such as may be prioritized based on the order of operations. Accordingly, for these examples, network switch 114 or target/response computing node 106 may identify the first sub-operation based on a priority assigned to the sub-operation.

At decision block 708, network switch 114 or target/response computing node 106 determines whether a sub-operation has been identified. If so, logic flow 700 branches to block 710 of FIG. 7B; otherwise, the logic flow branches to block 730, which is described below. At block 710, network switch 114 or target/response computing node 106 identifies the operands of the identified sub-operation, e.g. final results from target/response computing nodes or memory address ranges accessible at target/response computing nodes. At block 712, network switch 114 or target/response computing node 106 determines whether a value of one or more of the identified operands or a result of the identified sub-operation is presently stored local to network switch 114 or target/response computing node 106 (e.g., based on a previously performed sub-operation or prior receipt of applicable values corresponding to operands of the present sub-operation to be calculated). In examples where logic flow 700 is being implemented by network switch 114, network switch 114 may return a final result of a collective operation to requesting computing node 104 (e.g., in a lazy evaluation mode) if the result of the collective operation is presently stored local to network switch 114. In examples where logic flow 700 is being implemented by target/response computing node 106, target/response computing node 106 may return a result of a collective operation to requesting computing node 104 (if the result of the collective operation is presently stored local to target/response computing node 106).

If the sub-operation result is stored local to network switch 114 or target/response computing node 106, logic flow 700 branches to block 714, in which network switch 114 or target/response computing node 106 may update an entry in a table of results corresponding to the sub-operation, and the operation received in the collective operation request, before logic flow 700 returns to block 706 of FIG. 7A to identify a next sub-operation of the sub-operations identified at block 704. Otherwise, if the sub-operation result is not stored local to network switch 114 or target/response computing node 106, logic flow 700 branches to block 716, in which the network switch 114 or target/response computing node 106 identifies one or more targets from which a result or value corresponding to an operand of the sub-operation is presently stored. In some examples, network switch 114 or target/response computing node 106 may identify the one or more targets based on information included in the collective operation request message received from request computing node 104. For example, if logic flow 700 is implemented at network switch 114, network switch 114 may receive a list of target computing nodes to gather result values. If logic flow is implemented at target/response computing node 106, may include a list of identifiers (e.g., handles, parameters, addresses, descriptors, etc.) for each target associated with a collective operation performed at the target/response computing node 106.

It should be appreciated that, under certain conditions, one or more values corresponding to one or more operands of the sub-operation may be presently stored by network switch 114 or target/response computing node 106. Accordingly, in some examples, network switch 114 or target/response computing node 106 may only identify targets associated with the remaining operands for which no corresponding value is presently stored. At block 718, network switch 114 or target/response computing node 106 may forward requests to each target identified at block 716.

At decision block 720, network switch 114 or target/response computing node 106 may determine whether a previously unreceived response corresponding to one of the transmitted requests has been received. It should be appreciated that, in some examples, network switch 114 or target/response computing node 106 may return an acknowledgment message in response to having received the response from a target.

According to some examples, if network switch 114 or target/response computing node 106 determines a previously unreceived response corresponding to one of the transmitted requests has been received, logic flow 700 advances to block 722, in which network switch 114 or target/response computing node 106 stores a value of received response corresponding to the requested operand value. For example, the result of the sub-operation may be stored in a table that may include response values and/or results of operations (e.g., results of sub-operations and/or total results of operations). At decision block 724, network switch 114 or target/response computing node 106 determines whether a response has been received for each of the requests transmitted at block 718. If not, logic flow 700 returns to decision block 720 to continue to monitor for received responses; otherwise, logic flow 700 advances to block 726, in which the network switch 114 or target/response computing node 106 determines a result of the sub-operation based on the values received with the responses from the one or more targets.

At block 726, network switch 114 or target/response computing node 106 stores the result of the sub-operation before logic 700 returns to block 706 of FIG. 7A. In some examples, the result of the sub-operation may be stored in the aforementioned table. Calculations performed at block 726 and the storage of the results thereof performed at block 728 may be performed in parallel with block 706. In other words, in some examples, network switch 114 or target/response computing node 106 may perform calculations on the sub-operations at the same time as request messages are being transmitted and responses including corresponding values are being received.

Referring again to decision block 708 of FIG. 7A, if network switch 114 or target/response computing node 106 determines a sub-operation has not been identified (i.e., there are no outstanding sub-operations), logic flow 700 branches to block 730. At block 730, network switch 114 or target/response computing node 106 calculates a final result of the requested collective operation based on the previously calculated sub-operation results. At block 732, if logic flow 700 is being implemented by network switch 114, network switch 114 returns the final result to requesting computing node 104 from which the collective operation request was received. If logic flow 700 is being implemented by target/response computing node 106, target/response computing node 106 returns the final result to network switch 114 from which the collective operation request was forwarded. It should be appreciated that, in some examples, the final result forwarded from network switch 114 may be additionally or alternatively sent to a computing node other than requesting computing node, such as a storage computing node. In such examples, network switch 114 may be generalized such that a final result may not be returned to requesting computing node 104, but rather a code or handle to the result may be returned to requesting computing node 104.

It should be appreciated that at least a portion of the logic flow 700 may be executed by communication circuitry 310 and/or FPGA 320 of network switch 114 or by communication circuitry 220 and/or FPGA 230 of computing node 102 functioning as a target/response computing node 106. It should be further appreciated that, in some examples, logic flow 700 may be embodied as various instructions stored on a computer-readable media, which may be executed by modules, logic or features (e.g., processors or communication circuitry) of network switch 114 or target/response computing node 106 to cause network switch 114 or target/response computing node 106 to perform the logic flow 700. The computer-readable media may be embodied as any type of media capable of being read by modules, logic or to features of network switch 114 or target/response computing node 106 including, but not limited to, memory 216/304, storage 218/306, other memory or storage of network switch 114 or target/response computing node 106, portable media readable by a peripheral device of network switch 114 or target/response computing node 106, and/or other media.

Figure 8:
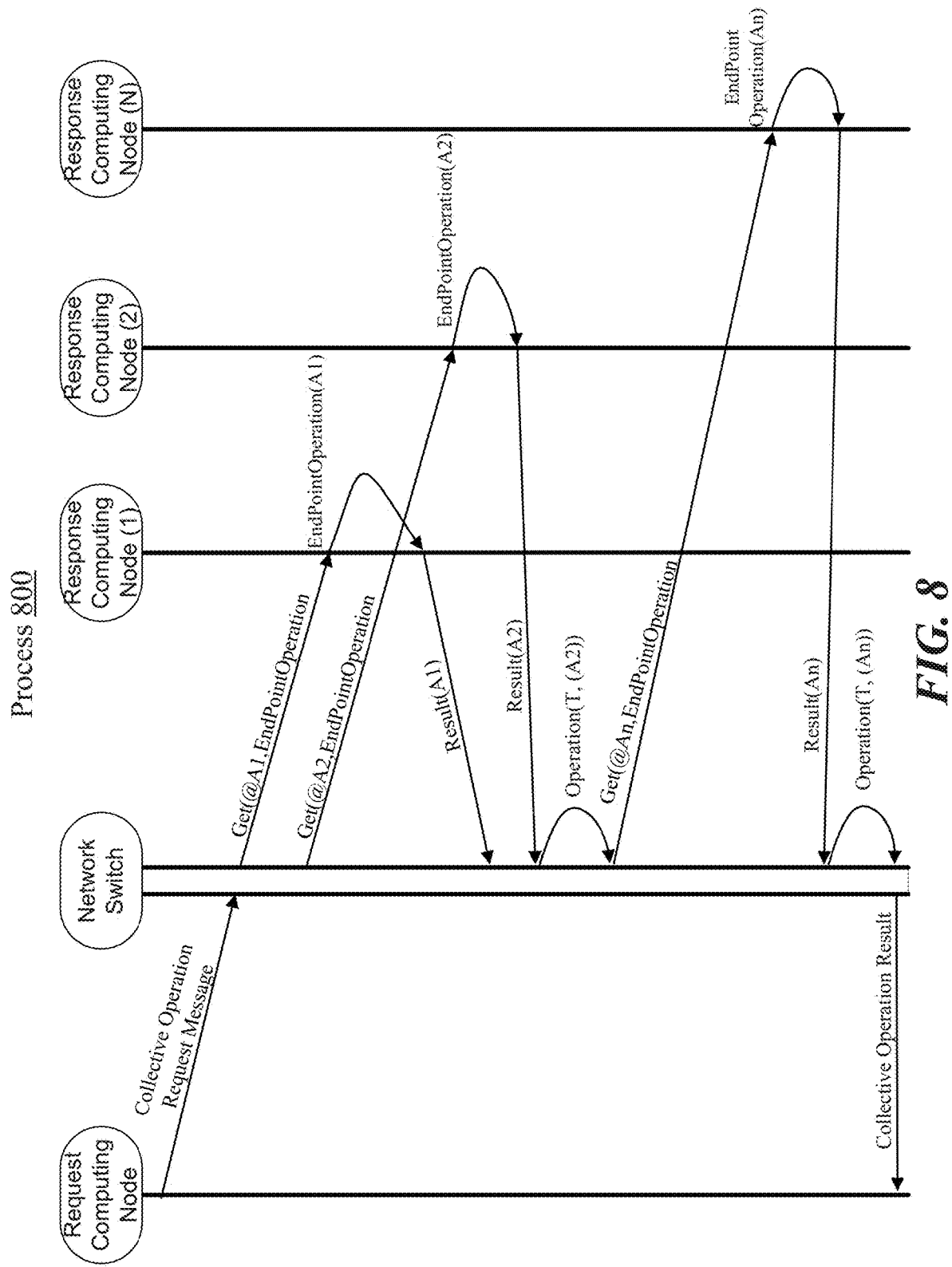
FIG. 8 illustrates a first example of a process for a multilayered collective operation.

FIG. 8 illustrates an example process 800. According to some examples, process 800 may be an example of a multilayered collective operation similar to collective operations described above for logic flow 600 and logic flow 700. As shown in FIG. 8, a collective operation request message may be sent to a network switch and responsive to the collective operation request message a series of unicast messages may be transmitted by the network switch to targeted response computing nodes (1) to (N). For example, respective unicast messages "Get(@A1, EndPointOperation" "Get(@A2, EndPointOperation" and "Get(@An, EndPointOperation" may be transmitted to response computing node (1), response computing node (2) and response computing node (N). Separate collective operations performed at response computing nodes (1) to (N) may include use of an algorithm (e.g., "A1" for response computing node (1)) indicated in the unicast message. The collective operation may be performed at each of these response computing nodes as described above for logic flow 700.

According to some examples, the network switch may be arranged to perform a collective operation on received results A1, A2 and A3 from response computing nodes (1) to (N). For these examples, "Operation (T, (A2))" may represent a collective operation on receive results A1 and A2 using algorithm "T" and "Operation (T, (An))" may represent a collective operation on all received results A1 to An using algorithm "T". In some examples, the collective operation may be performed at the network switch as described above for logic flow 700. Following completion of "Operation (T, (An))", the network switch may then send a final collective operation result to the request computing node.

Figure 9:
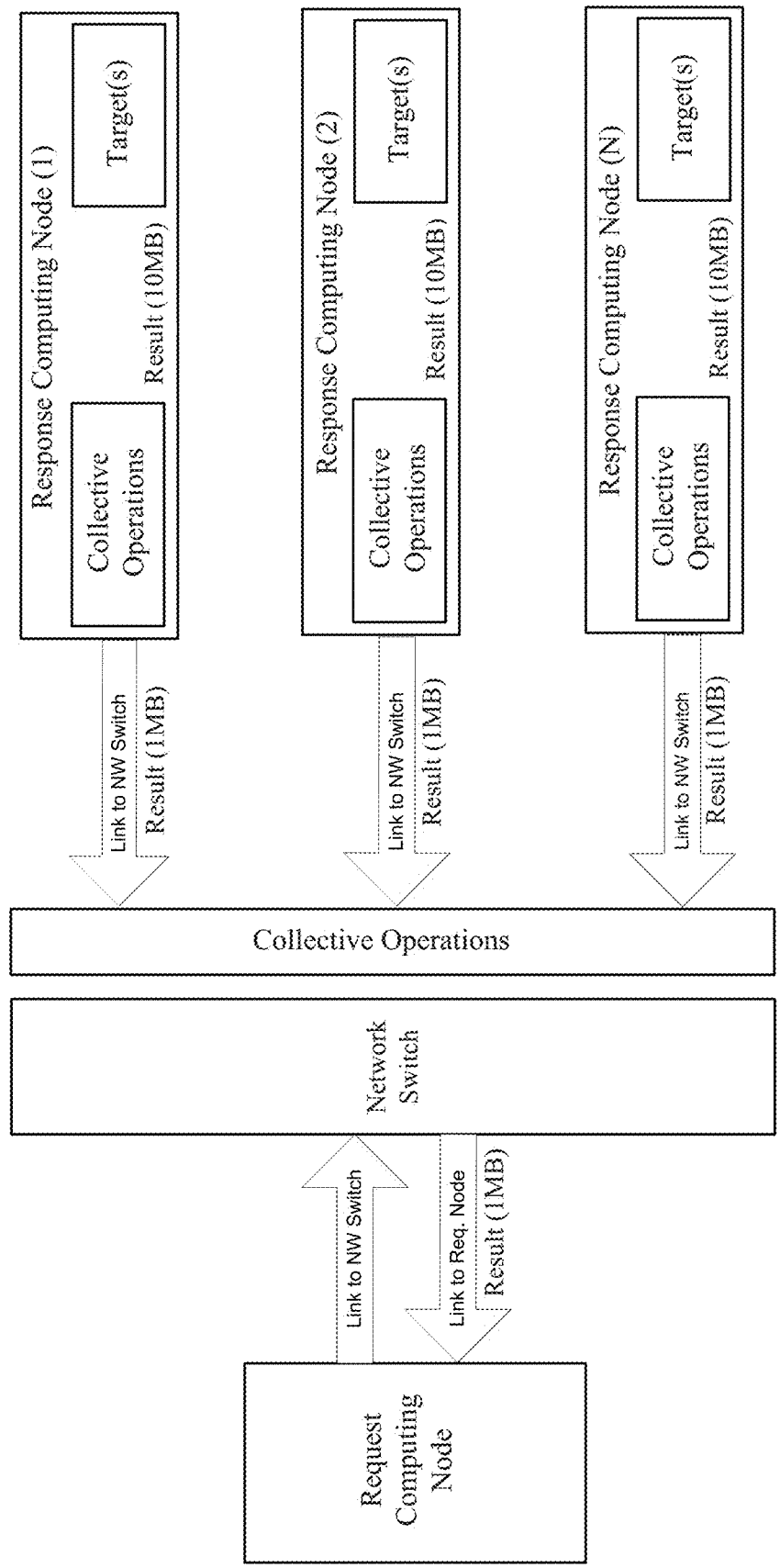
FIG. 9 illustrates a second example a process for a multilayered collective operation.

FIG. 9 illustrates an example process 900. According to some examples, process 900 illustrates an example of how a multilayered collective operation may be utilized to reduce relatively large amounts of data gathered by response computing nodes to substantially reduce amounts of data transmitted via links in a fabric responsive to a collective operation request message sent from a request computing node. For example, a total of 30 megabytes (MBs) of data may be gathered from targets at response computing nodes (1), (2) and (N) and reduced to a total of 3 MBs transmitted via links to a network switch. Further, collective operations at the network switch may reduce the 3 MBs received from the response computing nodes to a final total of 1 MB that is then sent to a request computing node. As a result of this multilayered collective operation, a total of 4 MBs of link data bandwidth is utilized compared to a total of 60 MBs that would be needed if no collective operations were performed. Also, if collective operations were only performed at the network switch, a total of 31 MBs would still be needed to provide requested results to the request computing node. A reduction from 31 to 4 MBs is still a substantial reduction in link data bandwidth. Examples, are not limited do these types of data reductions. Specific data reductions are merely provided as examples of how link data bandwidth may be conserved using multilayered collective operations.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASICs), programmable logic devices (PLDs,) digital signal processors (DSPs,) FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or to operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

The follow examples pertain to additional examples of technologies disclosed herein.

Example 1

An example apparatus may include circuitry at a computing node coupled with a plurality of target computing nodes communicatively coupled with the computing node through a network switch. For these examples, the circuitry may include logic to receive a request to obtain data from the plurality of target computing nodes. The logic may also generate a collective operation request message based on the request to obtain the data. The logic may also send the collective operation request message to the network switch, the collective operation request message to include information to cause the network switch to send unicast messages to respective target computing nodes of the plurality of computing nodes to direct the respective target computing nodes to perform collective operations to generate separate results and to send the separate results to the network switch. The collective operation request message may also include information to direct the network switch to perform a collective operation via use of received separate results to generate a final result and to send the final result to the computing node. The logic may also receive the final result from the network switch and provide the final result to the requester to fulfill the request to obtain the data from the plurality of target computing nodes.

Example 2

The apparatus of example 1, the information to cause the network switch to send the unicast message to respective target computing nodes further includes the information to have parameter information to be included in the unicast messages. The parameter information may be for use by respective target computing nodes to identify targets located at or accessible to respective target computing nodes from which operands are obtained and used to generate each separate result.

Example 3

The apparatus of example 2, the parameter information may include memory address ranges assigned to applications hosted by respective target computing nodes. The operands may be obtained from respective memory address ranges accessible to respective target computing nodes.

Example 4

The apparatus of example 3, the information to cause the network switch to send the unicast message to respective target computing nodes may further include the information to indicate one or more algorithms for use by the respective target computing nodes to generate the separate results via use of the operands.

Example 5

The apparatus of example 1, the information to direct the network switch to perform the collective operation via use of the received separate results to generate the final result further may include the information to indicate an algorithm for the network switch to use to generate the final result. The network switch may use the received separate results as inputs to the algorithm to generate the final result.

Example 6

The apparatus of example 1, the logic may receive the request to obtain data from an application hosted by the computing node.

Example 7

The apparatus of example 6, the logic to receive the final result from the network switch may include the logic to also receive an indication that at least one of the target computing nodes did not support performance of a collective operation. The logic may forward the indication to the application.

Example 8

The apparatus of example 1, the computing node, the network switch and the plurality of target computing nodes may be interconnected via a fabric architecture.

Example 9

An example method may include receiving, at circuitry for a computing node, a request to obtain data from a plurality of target computing nodes communicatively coupled with the computing node through a network switch. The method may also include generating a collective operation request message based on the request to obtain the data and sending the collective operation request message to the network switch, the collective operation request message including information to cause the network switch to send unicast messages to respective target computing nodes of the plurality of computing nodes to direct the respective target computing nodes to perform collective operations to generate separate results and to send the separate results to the network switch. The collective operation request message may also include information to direct the network switch to perform a collective operation using received separate results to generate a final result and to send the final result to the computing node. The method may also include providing the final result to the requester to fulfill the request to obtain the data from the plurality of target computing nodes.

Example 10

The method of example 9, the information to cause the network switch to send the unicast message to respective target computing nodes may further include the information having parameter information to be included in the unicast messages. The parameter information may be for use by respective target computing nodes to identify targets located at or accessible to respective target computing nodes from which operands are obtained and used to generate each separate result.

Example 11

The method of example 10, the parameter information may include memory address ranges assigned to applications hosted by respective target computing nodes. The operands may be obtained from respective memory address ranges accessible to respective target computing nodes.

Example 12

The method of example 11, the information to cause the network switch to send the unicast message to respective target computing nodes may further include the information indicating one or more algorithms for use by the respective target computing nodes to generate the separate results using the operands.

Example 13

The method of example 9, the information to direct the network switch to perform the collective operation using the received separate results to generate the final result may further include the information indicating an algorithm for the network switch to use to generate the final result, the network switch to use the received separate results as inputs to the algorithm to generate the final result.

Example 14

The method of example 9 may include receiving the request to obtain data from an application hosted by the computing node.

Example 15

The method of example 14 may also include receiving an indication that at least one of the target computing nodes did not support performance of a collective operation with the final result from the network switch. The method may also include forwarding the indication to the application.

Example 16

The method of example 9, the computing node, the network switch and the plurality of target computing nodes may be interconnected via a fabric architecture.

Example 17

An example at least one machine readable medium may include a plurality of instructions that in response to being executed by a system may cause the system to carry out a method according to any one of examples 9 to 16.

Example 18

An example apparatus may include means for performing the methods of any one of examples 9 to 16.

Example 19

An example at least one machine readable medium may include a plurality of instructions that in response to being executed by a system at a computing node may cause the system to receive a request to obtain data from a plurality of target computing nodes coupled with the computing node through a network switch. The instructions may also cause the system to generate a collective operation request message based on the request to obtain the data. instructions may also cause the system to send the collective operation request message to the network switch, the collective operation request message to include information to cause the network switch to send unicast messages to respective target computing nodes of the plurality of computing nodes to direct the respective target computing nodes to perform collective operations to generate separate results and to send the separate results to the network switch. The collective operation request message to also include information to direct the network switch to perform a collective operation via use of received separate results to generate a final result and to send the final result to the computing node. The instructions may also cause the system to receive the final result from the network switch and provide the final result to the requester to fulfill the request to obtain the data from the plurality of target computing nodes.

Example 20

The at least one machine readable medium of example 19, the information may cause the network switch to send the unicast message to respective target computing nodes further includes. The information to have parameter information may be included in the unicast messages. The parameter information may be for use by respective target computing nodes to identify targets located at or accessible to respective target computing nodes from which operands are obtained and used to generate each separate result.

Example 21

The at least one machine readable medium of example 20, the parameter information may include memory address ranges assigned to applications hosted by respective target computing nodes. The operands may be obtained from respective memory address ranges accessible to respective target computing nodes.

Example 22

The at least one machine readable medium of example 21, the information to cause the network switch to send the unicast message to respective target computing nodes may further include the information to indicate one or more algorithms for use by the respective target computing nodes to generate the separate results via use of the operands.

Example 23

The at least one machine readable medium of example 20, the information to direct the network switch to perform the collective operation via use of the received separate results to generate the final result may further include the information to indicate an algorithm for the network switch to use to generate the final result, the network switch to use the received separate results as inputs to the algorithm to generate the final result.

Example 24

The at least one machine readable medium of example 20, the instructions may further cause the system to receive the request to obtain data from an application hosted by the computing node.

Example 25

The at least one machine readable medium of example 24, the instructions to further cause the system to receive the final result from the network switch may include the instructions to further cause the system to receive an indication that at least one of the target computing nodes did not support performance of a collective operation and forward the indication to the application.

Example 26

The at least one machine readable medium of example 20, the computing node, the network switch and the plurality of target computing nodes may be interconnected via a fabric architecture.

Example 27

An example apparatus may include circuitry at a network switch including logic. The logic may receive a collective operation request message from a request computing node communicatively coupled with the network switch. The collective operation request message may include information for sending unicast messages to respective target computing nodes of a plurality of computing nodes communicatively coupled with the request computing node through the network switch. The unicast messages may direct the respective target computing nodes to perform collective operations to generate separate results and to send the separate results to the network switch. The logic may also send the unicast messages to the plurality of computing nodes. The logic may also receive the separate result and perform a collective operation via use of the received separate results to generate a final result. The collective operation may be performed based on additional information included in the collective operation request message. The logic may also send the final result to the request computing node.

Example 28

The apparatus of example 27, the information for sending unicast messages to respective target computing nodes may further include the information having parameter information to be included in the unicast messages. The parameter information may be for use by respective target computing nodes to identify targets located at or accessible to respective target computing nodes from which operands are obtained and used to generate each separate result.

Example 29

The apparatus of example 28, the parameter information may include memory address ranges assigned to applications hosted by respective target computing nodes, the operands obtained from respective memory address ranges accessible to respective target computing nodes.

Example 30

The apparatus of example 29, the information for sending the unicast message to respective target computing nodes may further include the information to indicate one or more algorithms for use by the respective target computing nodes to generate the separate results via use of the operands.

Example 31

The apparatus of example 27, the additional information may further indicate an algorithm for the network switch to use to generate the final result, the logic to use the received separate results as inputs to the algorithm to generate the final result Example 32

The apparatus of example 27, the logic may send the final result to the request computing node for the request computing node to provide the final result to an application hosted by the request computing node in order to fulfill a request by the application to obtain data from the plurality of target computing nodes.

Example 33

The apparatus of example 27, the network switch, the request computing node and the plurality of target computing nodes may be interconnected via a fabric architecture.

Example 34

An example method may include receiving, at circuitry for a network switch, a collective operation request message from a request computing node communicatively coupled with the network switch. The collective operation request message may include information for sending unicast messages to respective target computing nodes of a plurality of computing nodes communicatively coupled with the request computing node through the network switch. The unicast messages may direct the respective target computing nodes to perform collective operations to generate separate results and to send the separate results to the network switch. The method may also include receiving the separate results and perform a collective operation using the received separate results to generate a final result. The collective operation may be performed based on additional information included in the collective operation request message. The method may also include sending the final result to the request computing node.

Example 35

The method of example 34, the information for sending unicast messages to respective target computing nodes may further include the information having parameter information to be included in the unicast messages. The parameter information may be for use by respective target computing nodes to identify targets located at or accessible to respective target computing nodes from which operands are obtained and used to generate each separate result.

Example 36

The method of example 34, the parameter information may include memory address ranges assigned to applications hosted by respective target computing nodes, the operands obtained from respective memory address ranges accessible to respective target computing nodes.

Example 37

The method of example 36, the information for sending the unicast message to respective target computing nodes may further include the information indicating one or more algorithms for use by the respective target computing nodes to generate the separate results using the operands.

Example 38

The method of example 34, the additional information may further indicate an algorithm for the network switch to use to generate the final result. The network switch may use the received separate results as inputs to the algorithm to generate the final result.

Example 39

The method of example 34 may also include sending the final result to the request computing node for the request computing node to provide the final result to an application hosted by the request computing node in order to fulfill a request by the application to obtain data from the plurality of target computing nodes.

Example 40

The method of example 34 may also include the network switch, the request computing node and the plurality of target computing nodes being interconnected via a fabric architecture.

Example 41

An example at least one machine readable medium may include a plurality of instructions that in response to being executed by a system may cause the system to carry out a method according to any one of examples 34 to 40.

Example 42

An apparatus may include means for performing the methods of any one of examples 34 to 40.

Example 43

An example at least one machine readable medium may include a plurality of instructions that in response to being executed by a system at a network switch may cause the system to receive a collective operation request message from a request computing node communicatively coupled with the network switch. The collective operation request message may include information for sending unicast messages to respective target computing nodes of a plurality of computing nodes communicatively coupled with the request computing node through the network switch. The unicast messages may direct the respective target computing nodes to perform collective operations to generate separate results and to send the separate results to the network switch. The instructions may also cause the system to send the unicast messages to the plurality of computing nodes. The instructions may also cause the system to receive the separate results. The instructions may also cause the system to perform a collective operation via use of the received separate results to generate a final result. The collective operation may be performed based on additional information included in the collective operation request message. The instructions may also cause the system to send the final result to the request computing node.

Example 44

The at least one machine readable medium of example 43, the information for sending unicast messages to respective target computing nodes may further include the information having parameter information to be included in the unicast messages. The parameter information may be for use by respective target computing nodes to identify targets located at or accessible to respective target computing nodes from which operands are obtained and used to generate each separate result.

Example 45

The at least one machine readable medium of example 44, the parameter information may include memory address ranges assigned to applications hosted by respective target computing nodes. The operands may be obtained from respective memory address ranges accessible to respective target computing nodes.

Example 46

The at least one machine readable medium of example 45, the information for sending the unicast message to respective target computing nodes may further include the information to indicate one or more algorithms for use by the respective target computing nodes to generate the separate results via use of the operands.

Example 47

The at least one machine readable medium of example 43, the additional information to further indicate an algorithm. The instructions may further cause the system for the network switch to use the algorithm to generate the final result and use the received separate results as inputs to the algorithm to generate the final result.

Example 48

The at least one machine readable medium of example 43, the instructions may further cause the system to send the final result to the request computing node for the request computing node to provide the final result to an application hosted by the request computing node in order to fulfill a request by the application to obtain data from the plurality of target computing nodes.

Example 49

The at least one machine readable medium of example 45, the network switch, the request computing node and the plurality of target computing nodes may be interconnected via a fabric architecture.

Example 50

An example apparatus may include circuitry at a computing node. The circuitry may include logic to receive a unicast message from a network switch communicatively coupled to the computing node. The unicast message may include information to perform a collective operation to generate a result via use one or more operands obtained from one or more respective targets located at or accessible to the computing node. The logic may also send the result to the network switch for the network switch to use the result along with one or more other results sent from other computing nodes as part of a separate collective operation to generate a final result, the final result generated responsive to a collective operation request message received by the network switch from a request computing node communicatively coupled to the computing node through the network switch. The collective operation request message may be sent by the request computing node to the network switch responsive to a request to obtain data from the computing node and the other computing nodes.

Example 51

The apparatus of example 50, the information to perform the collective operation to generate the result may further include an indication of an algorithm for use by the computing node to generate the result using the one or more operands as inputs to the algorithm Example 52

The apparatus of example 50, the one or more respective targets may include one or more respective applications hosted by the computing node.

Example 53

The apparatus of example 52, the one or more operands may include values obtained from one or more memory address ranges assigned to the one or more respective applications.

Example 54

The apparatus of example 53, the information to perform the collective operation to generate the result may further include parameter information for use by the computing node to identify the one or more respective targets. The parameter information may include the one or more memory address ranges assigned to the one or more respective applications.

Example 55

The apparatus of example 50, the information to perform the collective operation to generate the result may further include an indication of an algorithm for use by the computing node to generate the result using the one or more operands as inputs to the algorithm.

Example 56

The apparatus of example 50, the one or more respective targets may include one or more respective applications hosted by the computing node.

Example 57

The apparatus of example 50, the one or more operands may include values obtained from one or more memory address ranges assigned to the one or more respective applications.

Example 58

The apparatus of example 57, the information to perform the collective operation to generate the result may further include parameter information for use by the computing node to identify the one or more respective targets. The parameter information may include the one or more memory address ranges assigned to the one or more respective applications.

Example 59

The apparatus of example 50, the computing node, the network switch and the request computing node may be interconnected via a fabric architecture.

Example 60

An example method may include receiving, at circuitry for a computing node, a unicast message from a network switch communicatively coupled to the computing node. The unicast message may include information to perform a collective operation to generate a result using one or more operands obtained from one or more respective targets located at or accessible to the computing node. The method may also include sending the result to the network switch for the network switch to use the result along with one or more other results sent from other computing nodes as part of a separate collective operation to generate a final result. The final result may be generated responsive to a collective operation request message received by the network switch from a request computing node communicatively coupled to the computing node through the network switch. The collective operation request message may be sent by the request computing node to the network switch responsive to a request to obtain data from the computing node and the other computing nodes.

Example 61

The method of example 60, the information to perform the collective operation to generate the result may further include an indication of an algorithm for use by the computing node to generate the result using the one or more operands as inputs to the algorithm.

Example 62

The method of example 60, the one or more respective targets may include one or more respective applications hosted by the computing node Example 63

The method of example 62, the one or more operands may include values obtained from one or more memory address ranges assigned to the one or more respective applications.

Example 64

The method of example 63, the information to perform the collective operation to generate the result may further include parameter information for use by the computing node to identify the one or more respective targets. The parameter information may include the one or more memory address ranges assigned to the one or more respective applications.

Example 65

The method of example 60, the information to perform the collective operation to generate the result may further include an indication of an algorithm for use by the computing node to generate the result using the one or more operands as inputs to the algorithm.

Example 66

The method of example 60, the one or more respective targets may include one or more respective applications hosted by the computing node.

Example 67

The method of example 66, the one or more operands may include values obtained from one or more memory address ranges assigned to the one or more respective applications.

Example 68

The method of example 67, the information to perform the collective operation to generate the result may further include parameter information for use by the computing node to identify the one or more respective targets. The parameter information may include the one or more memory address ranges assigned to the one or more respective applications.

Example 69

The method of example 60, the computing node, the network switch and the request computing node may be interconnected via a fabric architecture.

Example 70

At least one machine readable medium may include a plurality of instructions that in response to being executed by a system may cause the system to carry out a method according to any one of examples 60 to 69.

Example 71

An example apparatus may include means for performing the methods of any one of examples 60 to 98.

Example 72

An example at least one machine readable medium may include a plurality of instructions that in response to being executed by a system at a computing node may cause the system to receive a unicast message from a network switch communicatively coupled to the computing node. The unicast message may include information to perform a collective operation to generate a result via use one or more operands obtained from one or more respective targets located at or accessible to the computing node. The instructions may also cause the system to send the result to the network switch for the network switch to use the result along with one or more other results sent from other computing nodes as part of a separate collective operation to generate a final result. The final result may be generated responsive to a collective operation request message received by the network switch from a request computing node communicatively coupled to the computing node through the network switch. The collective operation request message may be sent by the request computing node to the network switch responsive to a request to obtain data from the computing node and the other computing nodes.

Example 73

The at least one machine readable medium of example 72, the information to perform the collective operation to generate the result may further include an indication of an algorithm for use by the computing node to generate the result using the one or more operands as inputs to the algorithm.

Example 74

The at least one machine readable medium of example 72, the one or more respective targets may include one or more respective applications hosted by the computing node.

Example 75

The at least one machine readable medium of example 74, the one or more operands may include values obtained from one or more memory address ranges assigned to the one or more respective applications.

Example 76

The at least one machine readable medium of example 75, the information to perform the collective operation to generate the result may further include parameter information for use by the computing node to identify the one or more respective targets. The parameter information may include the one or more memory address ranges assigned to the one or more respective applications.

Example 77

The at least one machine readable medium of example 72, the information to perform the collective operation to generate the result may further include an indication of an algorithm for use by the computing node to generate the result using the one or more operands as inputs to the algorithm.

Example 78

The at least one machine readable medium of example 72, the one or more respective targets may include one or more respective applications hosted by the computing node.

Example 79

The at least one machine readable medium of example 72, the one or more operands may include values obtained from one or more memory address ranges assigned to the one or more respective applications.

Example 80

The at least one machine readable medium of example 79, the information to perform the collective operation to generate the result may further include parameter information for use by the computing node to identify the one or more respective targets. The parameter information may include the one or more memory address ranges assigned to the one or more respective applications.

Example 81

The at least one machine readable medium of example 72, the computing node, the network switch and the request computing node may be interconnected via a fabric architecture.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a circuit at a computing node coupled with a plurality of target computing nodes to be communicatively coupled with the computing node through a network switch, the circuit to:
receive a request to obtain data from the plurality of target computing nodes;
generate a collective operation request message based on the request to obtain the data;
send the collective operation request message to the network switch, the collective operation request message to include information to cause the network switch to send unicast messages to respective target computing nodes of the plurality of target computing nodes to direct the respective target computing nodes to perform collective operations to generate separate results and to send the separate results to the network switch, the collective operation request message to also include information to direct the network switch to perform a collective operation via use of received separate results to generate a final result and to send the final result to the computing node, wherein the unicast messages indicate memory address ranges assigned to applications hosted by the respective target computing nodes, and wherein the memory address ranges are used to obtain operands and to generate the separate results;
receive the final result from the network switch; and
provide the final result to fulfill the request to obtain the data from the plurality of target computing nodes.

2. The apparatus of claim 1, wherein the information to cause the network switch to send the unicast messages to the respective target computing nodes further includes parameter information to be included in the unicast messages, the parameter information for use by respective target computing nodes to identify the memory address ranges assigned to applications hosted by the respective target computing nodes.

3. The apparatus of claim 1, wherein the information to cause the network switch to send the unicast messages to the respective target computing nodes further includes the information to indicate one or more algorithms for use by the respective target computing nodes to generate each separate result via use of the operands.

4. At least one non-transitory machine readable medium comprising a plurality of instructions that in response to being executed by a system at a computing node cause the system to:
receive a unicast message from a network switch communicatively coupled to the computing node, the unicast message to include information to perform a collective operation to generate a result via use one or more operands obtained from one or more respective targets located at or accessible to the computing node, wherein the unicast message indicates memory address ranges assigned to applications hosted by the one or more respective target, and wherein the memory address ranges are used to obtain the one or more operands and to generate the result; and
send the result to the network switch for the network switch to use the result along with one or more other results sent from other computing nodes as part of a separate collective operation to generate a final result, the final result generated responsive to a collective operation request message received by the network switch from a request computing node communicatively coupled to the computing node through the network switch, the collective operation request message sent by the request computing node to the network switch responsive to a request to obtain data from the computing node and the other computing nodes.

5. The at least one non-transitory machine readable medium of claim 4, comprising the information to perform the collective operation to generate the result further including parameter information for use by the computing node to identify the one or more respective targets, the parameter information including the one or more memory address ranges assigned to the one or more respective applications.

6. The apparatus of claim 1, comprising the information to direct the network switch to perform the collective operation via use of the received separate results to generate the final result further includes the information to indicate an algorithm for the network switch to use to generate the final result, the network switch to use the received separate results as inputs to the algorithm to generate the final result.

7. The apparatus of claim 1, wherein the circuit is further to receive the request to obtain data from an application hosted by the computing node.

8. The apparatus of claim 7, wherein the circuit to receive the final result from the network switch is to also receive an indication that at least one of the target computing nodes did not support performance of a collective operation, and to forward the indication to the application.

9. The apparatus of claim 1, comprising the computing node, the network switch and the plurality of target computing nodes are interconnected via a fabric architecture.

10. An apparatus comprising:
a circuit at a network switch, the circuit to:
receive a collective operation request message from a request computing node communicatively coupled with the network switch, the collective operation request message to include information for sending unicast messages to respective target computing nodes of a plurality of computing nodes communicatively coupled with the request computing node through the network switch, the unicast messages to direct the respective target computing nodes to perform collective operations to generate separate results and to send the separate results to the network switch;
send the unicast messages to the plurality of computing nodes, wherein the unicast messages indicate memory address ranges assigned to applications hosted by the respective target computing nodes, and wherein the memory address ranges are used to obtain operands and to generate the separate results;
receive the separate results;
perform a collective operation via use of the received separate results to generate a final result, the collective operation performed based on additional information included in the collective operation request message; and
send the final result to the request computing node.

11. The apparatus of claim 10, the information for sending the unicast messages to the respective target computing nodes further includes parameter information to be included in the unicast messages, the parameter information for use by respective target computing nodes to identify the memory address ranges assigned to applications hosted by the respective target computing nodes.

12. The apparatus of claim 10, wherein the information for sending the unicast messages to the respective target computing nodes further includes the information to indicate one or more algorithms for use by the respective target computing nodes to generate each separate result via use of the operands.

13. The apparatus of claim 10, comprising the additional information to further indicate an algorithm for the network switch to use to generate the final result, the circuit to use the received separate results as inputs to the algorithm to generate the final result.

14. The apparatus of claim 10, wherein the circuit is to send the final result to the request computing node for the request computing node to provide the final result to an application hosted by the request computing node in order to fulfill a request by the application to obtain data from the plurality of target computing nodes.

15. The at least one non-transitory machine readable medium of claim 4, the one or more operands comprise values obtained from the one or more memory address ranges assigned to the one or more respective applications.

16. The at least one non-transitory machine readable medium of claim 4, wherein the information to perform the collective operation to generate the result further including an indication of an algorithm for use by the computing node to generate the result using the one or more operands as inputs to the algorithm.

17. The at least one non-transitory machine readable medium of claim 4, the one or more respective targets located at or accessible to the computing node comprises the one or more respective applications hosted by the computing node.

* * * * *